United States Patent
Bandakka et al.

(10) Patent No.: US 8,869,138 B2
(45) Date of Patent: Oct. 21, 2014

(54) ROBUST FIRMWARE UPDATE WITH RECOVERY LOGIC

(75) Inventors: Jyothi Bandakka, Bangalore (IN); Sridhara Chinya Venkatanaranappa, Bangalore (IN)

(73) Assignee: Wyse Technology L.L.C., San Jose, CA (US)

( * ) Notice: Subject to any disclaimer, the term of this patent is extended or adjusted under 35 U.S.C. 154(b) by 292 days.

(21) Appl. No.: 13/295,021

(22) Filed: Nov. 11, 2011

(65) Prior Publication Data

US 2013/0125107 A1 May 16, 2013

(51) Int. Cl.
*G06F 9/445* (2006.01)

(52) U.S. Cl.
USPC ............................ 717/174; 717/171; 717/172

(58) Field of Classification Search
USPC .................................. 717/169–176; 709/203
IPC .................. G06F 8/60,8/61, 8/65, 8/70
See application file for complete search history.

(56) References Cited

U.S. PATENT DOCUMENTS

| | | | | |
|---|---|---|---|---|
| 7,360,211 B2 * | 4/2008 | Hyden et al. | | 717/174 |
| 7,401,120 B2 * | 7/2008 | Walbeck et al. | | 709/203 |
| 7,526,539 B1 * | 4/2009 | Hsu | | 709/223 |
| 7,614,048 B1 * | 11/2009 | Musser et al. | | 717/173 |
| 7,631,173 B2 | 12/2009 | Fausak | | |
| 7,644,406 B2 * | 1/2010 | Gustafson et al. | | 717/172 |
| 7,673,301 B1 | 3/2010 | Righi et al. | | |
| 7,716,414 B2 * | 5/2010 | Slyz et al. | | 711/103 |
| 7,747,997 B1 * | 6/2010 | Rao | | 717/170 |
| 7,805,719 B2 * | 9/2010 | O'Neill | | 717/168 |
| 7,844,945 B2 * | 11/2010 | Bhagia et al. | | 717/107 |
| 7,873,959 B2 * | 1/2011 | Zhu et al. | | 717/172 |
| 7,890,951 B2 * | 2/2011 | Vinberg et al. | | 717/174 |
| 8,122,447 B2 * | 2/2012 | Cohen et al. | | 717/175 |
| 8,196,130 B2 * | 6/2012 | Chen et al. | | 717/168 |
| 8,589,910 B2 * | 11/2013 | Zubas et al. | | 717/173 |
| 8,601,460 B2 * | 12/2013 | Karstens | | 717/168 |
| 8,631,399 B2 * | 1/2014 | Endo et al. | | 717/174 |
| 8,713,559 B2 * | 4/2014 | Fallon et al. | | 717/172 |
| 2006/0130046 A1 | 6/2006 | O'Neill | | |
| 2009/0222650 A1 | 9/2009 | Chen | | |
| 2010/0169709 A1 | 7/2010 | Chiu et al. | | |

OTHER PUBLICATIONS

Kim et al,"Remote Progressive Firmware Update for Flash-Based Networked Embedded Systems", ACM, pp. 407-412, 2009.*
Li et al, "VIPER: Verifying the Integrity of PERipherals' Firmware", ACM, pp. 3-16, 2011.*
Shrirner et a, "System-level Development of Embedded Software" IEEE, pp. 903-909, 2010.*

(Continued)

*Primary Examiner* — Anil Khatri
(74) *Attorney, Agent, or Firm* — Baker Botts L.L.P.

(57) ABSTRACT

Systems and methods for updating firmware include a firmware update module executing on a client device. A firmware package to be installed on the client device may be verified by the firmware update module, including verifying that firmware files included in the firmware package are intact prior to beginning a firmware update. Recovery logic for enabling a client device to boot-up from a functional partition after a failed firmware update may be provided. The recovery logic may ensure that, when a firmware update failure occurs, the client device may boot-up from a functional partition. A recovery process may back up certain components stored in the client device. An update status related to the firmware update process may be provided.

24 Claims, 22 Drawing Sheets

(56) References Cited

OTHER PUBLICATIONS

Wernli et al, "Using First-class Contexts to realize Dynamic Software Updates", ACM, pp. 1-11, 2011.*

"Preboot Execution Environment (PXE) Specification," Intel Corporation, Sep. 20, 1999, Ver. 2.1.

International Search Report and Written Opinion; PCT/US2012/051009; pp. 9, Nov. 14, 2012.

International Preliminary Report on Patentability for International Application PCT/US2012/051009 filed Aug. 15, 2012, mailing date May 22, 2014, 8 pages.

* cited by examiner

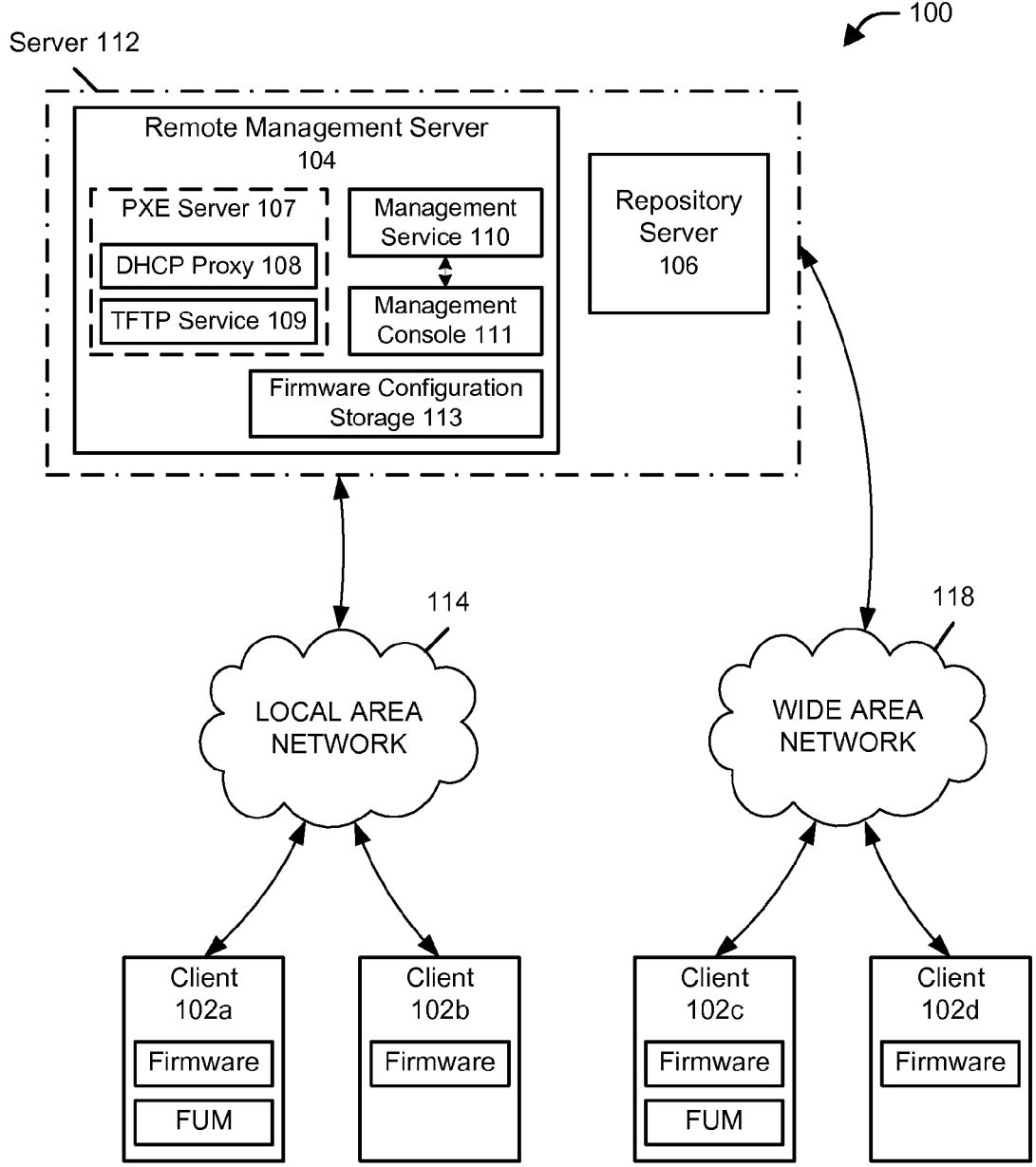

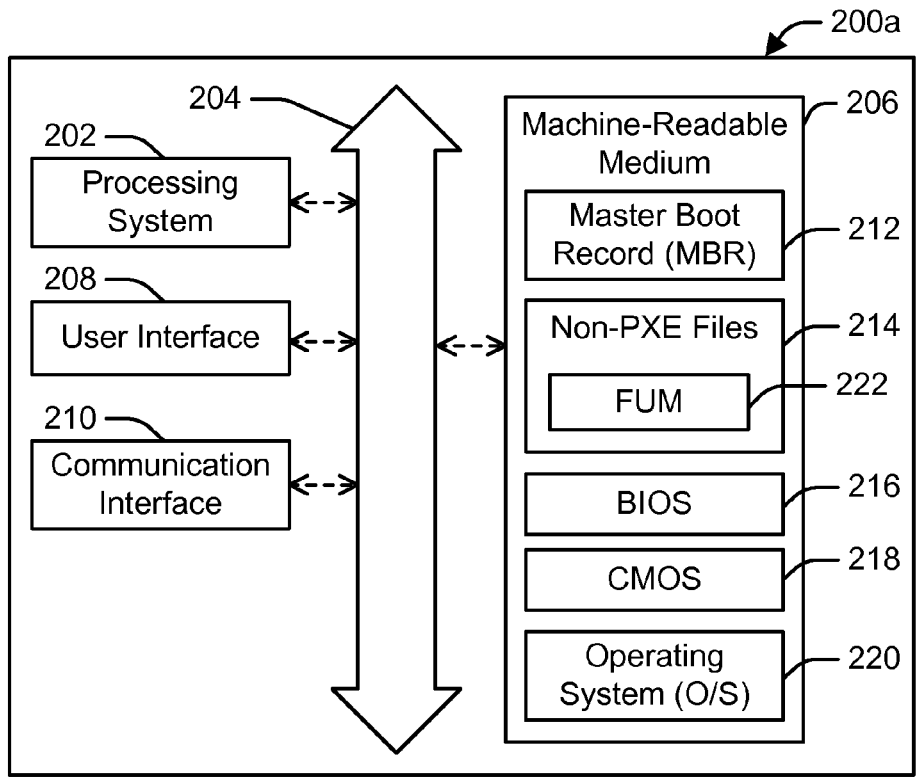
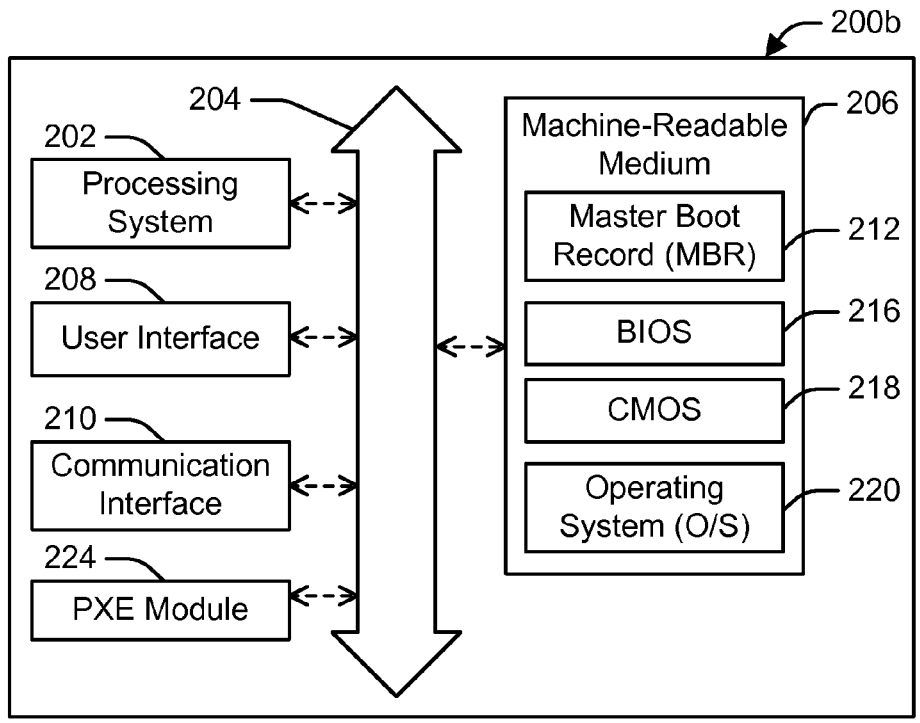

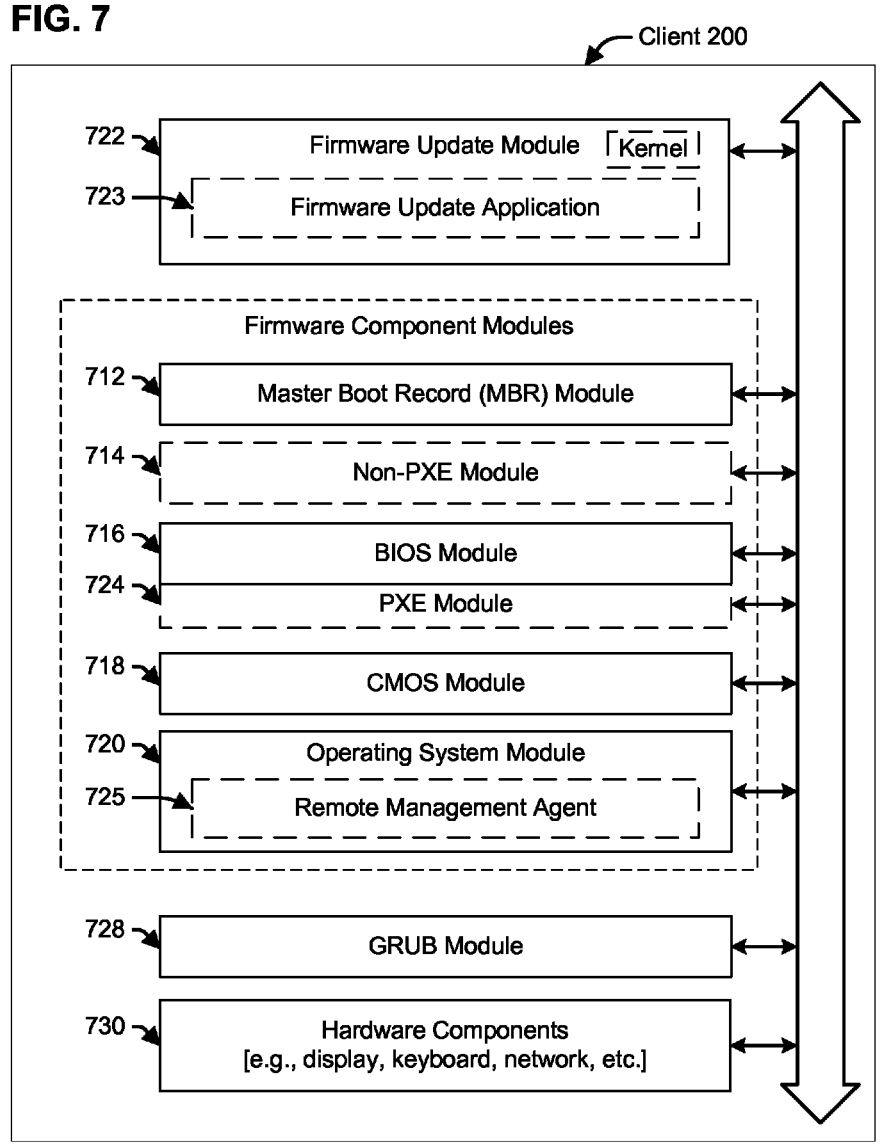

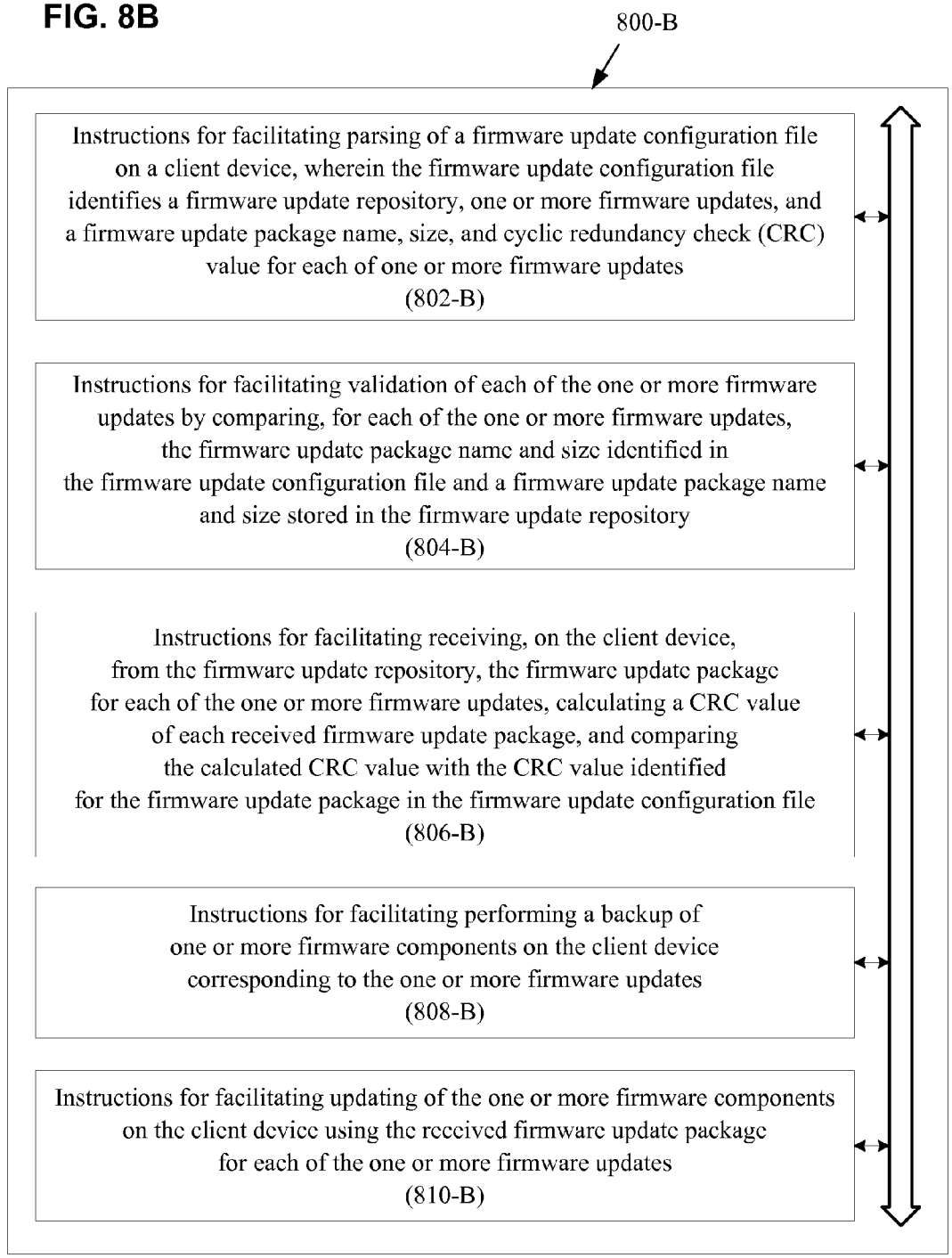

Instructions for facilitating parsing of a firmware update configuration file on a client device, wherein the firmware update configuration file identifies a firmware update repository, one or more firmware updates, and a firmware update package name, size, and cyclic redundancy check (CRC) value for each of one or more firmware updates
(802-B)

Instructions for facilitating validation of each of the one or more firmware updates by comparing, for each of the one or more firmware updates, the firmware update package name and size identified in the firmware update configuration file and a firmware update package name and size stored in the firmware update repository
(804-B)

Instructions for facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file
(806-B)

Instructions for facilitating performing a backup of one or more firmware components on the client device corresponding to the one or more firmware updates
(808-B)

Instructions for facilitating updating of the one or more firmware components on the client device using the received firmware update package for each of the one or more firmware updates
(810-B)

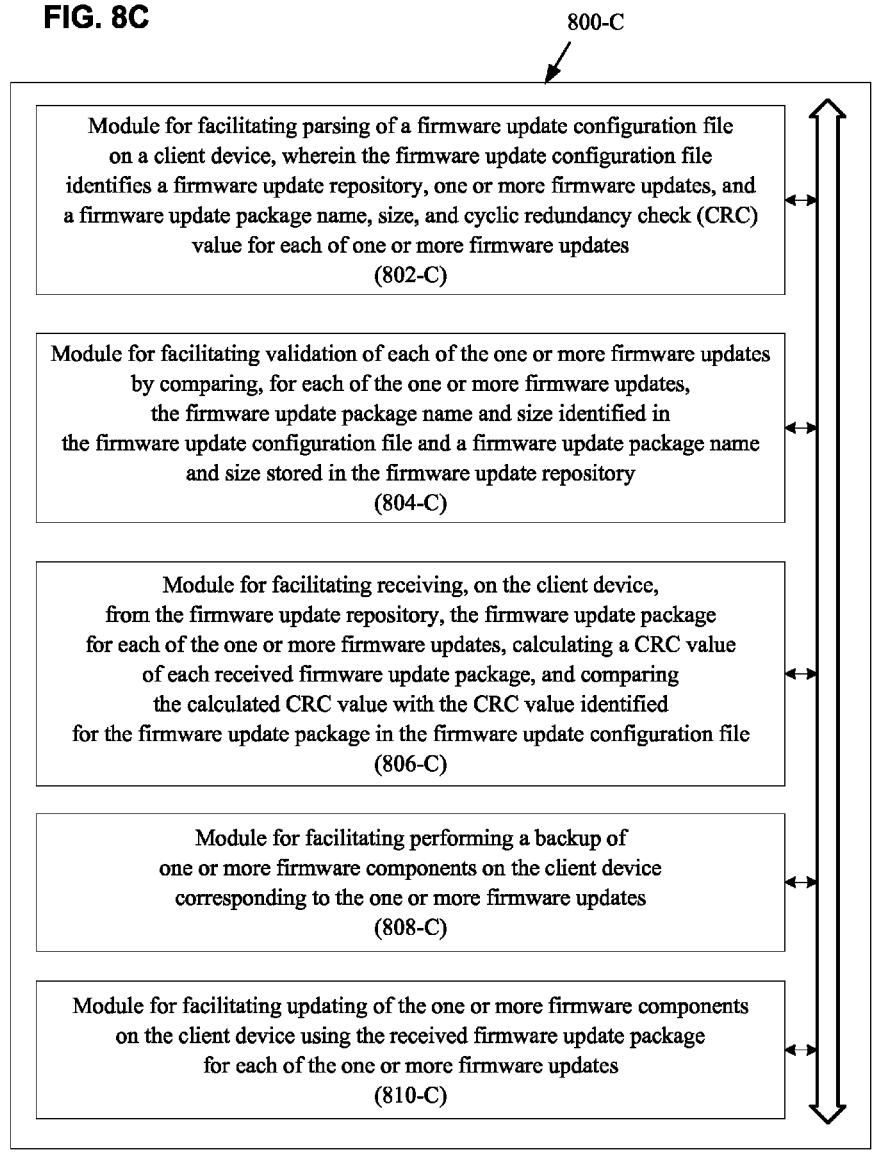

ROBUST FIRMWARE UPDATE WITH RECOVERY LOGIC

FIELD

The disclosure relates in general to firmware updates, and more particularly to robust methods for performing firmware updates having recovery logic.

BACKGROUND

In order for a network administrator to update the firmware on a large number of thin client devices, the administrator must manually update the firmware on each device individually. The individual installation approach, however, is prohibitively time consuming especially when large numbers of client devices or frequent updates are concerned. In installing or updating general purpose software or firmware on large numbers of thin client devices, an administrator may use a remote management software to remotely install or update software or firmware on the client devices. If the remote management software is used to install or update firmware on a client device, and if a firmware package becomes corrupted, a network outage or other issue interrupts the firmware update process, and/or any other error or failure occurs during the firmware update process, the error or failure in the update process can result in the client device becoming unusable. A need therefore exists for methods and systems to enable network administrators to efficiently and reliably update firmware on large numbers of thin client devices.

SUMMARY

In one aspect of the disclosure, a method for updating firmware components of a client device using a firmware update module running on the client device, may comprise: facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates; facilitating validation of each of the one or more firmware updates by comparing, for each of the one or more firmware updates, the firmware update package name and size identified in the firmware update configuration file and a firmware update package name and size stored in the firmware update repository; facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file; facilitating performing a backup of one or more firmware components on the client device corresponding to the one or more firmware updates; and facilitating updating of the one or more firmware components on the client device using the received firmware update package for each of the one or more firmware updates.

In one aspect of the disclosure, a machine-readable storage medium may be encoded with instructions executable by one or more processors to perform one or more operations for updating firmware components of a client device using a firmware update module running on the client device. The one or more operations may comprise: facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates; facilitating validation of each of the one or more firmware updates by comparing, for each of the one or more firmware updates, the firmware update package name and size identified in the firmware update configuration file and a firmware update package name and size stored in the firmware update repository; facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file; facilitating performing a backup of one or more firmware components on the client device corresponding to the one or more firmware updates; and facilitating updating of the one or more firmware components on the client device using the received firmware update package for each of the one or more firmware updates.

In one aspect of the disclosure, a hardware apparatus for updating firmware components of a client device using a firmware update module running on the client device may comprise one or more modules configured to perform one or more operations comprising: facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates; facilitating validation of each of the one or more firmware updates by comparing, for each of the one or more firmware updates, the firmware update package name and size identified in the firmware update configuration file and a firmware update package name and size stored in the firmware update repository; facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file; facilitating performing a backup of one or more firmware components on the client device corresponding to the one or more firmware updates; and facilitating updating of the one or more firmware components on the client device using the received firmware update package for each of the one or more firmware updates.

In one aspect of the disclosure, an apparatus for updating firmware components of a client device using a firmware update module running on the client device may comprise: means for facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates; means for facilitating validation of each of the one or more firmware updates by comparing, for each of the one or more firmware updates, the firmware update package name and size identified in the firmware update configuration file and a firmware update package name and size stored in the firmware update repository; means for facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file; means for facilitating performing a backup of one or more firmware components on the client device corresponding to the one or more firmware updates; and means for facilitating updating of the one or more firmware components on the client device using the received firmware update package for each of the one or more firmware updates.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIG. 1 is a conceptual block diagram of a computer network and system, in accordance with various aspects of the subject technology.

FIGS. 2A and 2B are conceptual block diagrams illustrating examples of client devices, in accordance with various aspects of the subject technology.

FIG. 7 is a simplified block diagram of a client device, in accordance with various aspects of the subject technology.

FIG. 8B is a block diagram representing an example of a machine-readable storage medium encoded with instructions executable by a processor to perform a method for updating firmware components of a client device, in accordance with one aspect of the disclosure.

FIG. 8C is a block diagram representing an example of an apparatus for updating firmware components of a client device, in accordance with one aspect of the disclosure.

DETAILED DESCRIPTION

Figure 3:
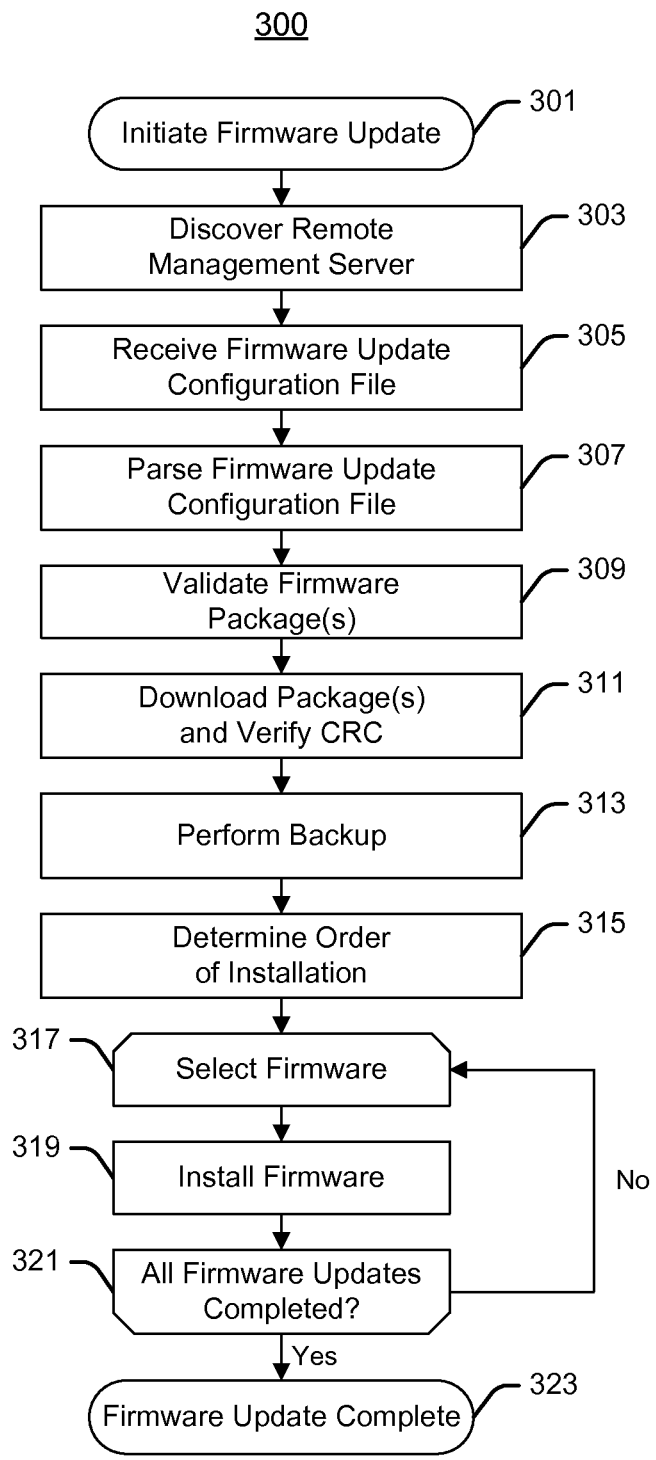
FIG. 3 is a flow diagram illustratively showing a process for updating firmware on a client device, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The updating of firmware on large numbers of thin client devices presents a growing problem. Firmware includes the set of machine-readable instructions, stored in machine-readable media, used to provide the basic input/output functionality of a computing system. For example, firmware on a personal computer can include one or more of a basic input/output system (BIOS), a complementary metal-oxide-semiconductor (CMOS) memory, non pre-boot execution (non-PXE) files, a master boor record (MBR), and/or an operating system (O/S). A computing system may be configured to execute one or more components of the firmware immediately upon booting up of the system. Upon executing, the firmware can provide a basic computing environment used to execute and use software applications and hardware devices on the computing system.

Because the firmware provides the basic input/output functionality of a computing system, any error or failure occurring during an update of the firmware has the potential to render the computing system unusable. For example, the installation of an invalid firmware on a client device may render the client device unable to boot-up, and thereby unable to install a valid firmware. Similarly, the interruption of the update of a firmware on a client device may render the client device unable to boot-up, and thereby cause the client device to be unable to resume operation to complete the firmware update. Installation failures that result in the computing system become unusable are described herein as resulting in the "bricking" of the system or device.

In order to improve the reliability of a firmware update process, the integrity of a firmware installation package on a target client device can be checked prior to beginning the installation of the package on the client device. In order to verify the integrity of an image package, a computer administrator may make sure that all imaging components are present on the target client device, and make sure that all imaging components file sizes are correct. For example, the imaging component file sizes can be compared to the expected file sizes indicated in an installation configuration file (e.g., an extensible markup language (XML) configuration file). In real world scenarios where multiple different images are configured for installation on multiple different devices, however, the verification process can create a considerable workload, especially in situations in which the verification and checking is performed manually.

In some situations, a remote management software may be used to initiate a firmware update process on a client device from a remote management server located remotely from the client device. In such situations, however, there may be no communication from the firmware update process to the remote management software during the update process, and communication may only resume at the end of the update process. As a result, if a user has scheduled a firmware update activity from the remote management software, the user may only receive minimal progress or status updates. For example, the user may only receive progress updates indicating that the update is 'in-progress' or, once the update is complete, whether the update was a 'success' or a 'failure'. The user may therefore not know, in real-time during the update procedure, which component update is executing or what percentage of the update is completed.

To address the shortcomings of prior firmware update processes, improved firmware update processes and systems have been developed. The improved firmware processes and systems can include a firmware update module (or firmware updater) running on a target client device. The following description and accompanying figures describe the improved processes and systems for performing firmware updates on one or more client devices.

First, the methods and systems can verify that a firmware package to be installed on a client device is valid and that all firmware files are intact prior to beginning installation. The firmware update module may rely on a firmware update configuration file to perform firmware updates. The firmware update configuration file can be received, on the client device, from a remote management server storing firmware update information for a plurality of client devices. The firmware update configuration file can identify a list of files or packages that should be included as part of the firmware update, as well as file sizes and cyclic redundancy check (CRC) codes for the files and a repository path identifying a location from which the files can be retrieved. The firmware update configuration file can be a script file, an extensible markup language (XML) file, or other appropriate file. The integrity of the firmware package and files can thus be checked using the firmware update configuration file, corresponding to the firmware package, that includes a list of the firmware package files, file sizes, and CRC codes for the files. In particular, the validation of the firmware package can be performed by receiving the firmware update configuration file, by making a list of files identified in the configuration file and their corresponding file size, and by comparing the list with the files (and corresponding file sizes) stored in the repository path mentioned in the configuration file. If the files and files sizes in the list and in the repository path do not match, the firmware update process can report an appropriate error and does not proceed. If the file list and file sizes are correct, the firmware update process may proceed to download the files from the repository path, to calculate the CRC for each downloaded file, and to compare with the CRC value in the configuration file with the calculated value. If the CRC values do not match, the update process can stop and report an appropriate error to a remote management server or software.

Second, the methods and systems can include recovery logic for enabling a client device to boot-up from either an operating system O/S partition, a non-PXE partition, or another functional partition after a failed firmware update. The recovery logic may ensure that in most (if not all) firmware update failure cases, the client device can boot-up from a functional partition even if the integrity of another partition has been compromised as a result of the failed update. In particular, a recovery process can begin by backing up existing components stored in the client device, for example by backing up the components into a random access memory (RAM) of the client device. The backed up components can include mandatory components such as a master boot record (MBR), non pre-boot execution environment (non-PXE) files, BIOS, and CMOS files. The firmware update process can then be performed. In case any failures occur during the update process, the backup copy of the components can be restored to the client device. For example, if a failure occurs during updating of the BIOS or CMOS, the preexisting BIOS and CMOS components can be restored from the back-up. If a failure occurs during update of the operating system (O/S) partition or of the non-PXE files, the MBR and non-PXE partitions can be restored from the back-up so that at least the non-PXE partition will be working and can be used to retry performing the O/S partition update. The back-up copy can thus be used to avoid rendering the client device unusable (or bricked up) if a failure occurs during the firmware update process.

Finally, the methods and systems can provide a user with the ability to see an update status related to individual component updates, and including a percentage progress of the firmware update process, when the firmware update process is scheduled using a remote management software. In order to provide the progress update, the firmware update process can send a message to a remote management server while starting the update process of any component of the firmware, and can also send a message at the end of each component update. The firmware update process can further send the percentage completion of the firmware update process when the upgrade process takes significant time. For example, in the case of updating an O/S which may take from 4 minutes to 40 minutes or more to complete, the firmware update process can send percentage completion information for every 25% of progress.

FIG. 1 illustrates an example of a system 100 for updating firmware on a plurality of client devices, in accordance with various aspects of the subject technology. The system 100 may include one or more client devices 102 (e.g., 102a, 102b, 102c, 102d) in communication with a server computing device 112 (server) via either a local area network 114 or a wide area network 118. In some aspects, the server 112 is configured to allow remote sessions (e.g., remote desktop sessions) wherein users can access applications and files on the server 112 by logging onto the server 112 from a client device 102. Such a connection may be established using any of several well-known techniques such as the Remote Desktop Protocol (RDP) on a Windows-based server. In some aspects, the client devices 102 may communicate with the server 112 using file transfer protocol (FTP) or trivial file transfer protocol (TFTP), hypertext transfer protocol (HTTP), hypertext transfer protocol secure (HTTPS), or other suitable protocols.

By way of illustration and not limitation, a client device 102 can represent a computer, a mobile phone, a laptop computer, a thin client device, a personal digital assistant (PDA), a portable computing device, or a suitable device with a processor. In one example, a client device 102 is a smartphone (e.g., iPhone, Android phone, Blackberry, etc.). In certain configurations, a client device 102 can represent a cashier device, an audio player, a game console, a camera, a camcorder, an audio device, a video device, a multimedia device, or a device capable of supporting a connection to a remote server. In one example, a client device 102 can be mobile. In another example, a client device 102 can be stationary. According to one aspect of the disclosure, a client device 102 may be a device having at least a processor and a memory, where the total amount of memory of the client device 102 could be less than the total amount of memory in a server 112. In one example, a client device 102 does not have a hard disk. In one aspect, a client device 102 may comprise flash memory instead of a hard disk. In one aspect, a client device may be one or more servers. In one aspect, a client device may include one or more client devices. Each client device 102 includes firmware including one or more of a MBR, an operating system (O/S), non-PXE files, CMOS, and BIOS. Some client devices 102a, 102c may include a firmware update module (FUM), while other client devices 102b, 102d may not include a FUM.

In a preferred aspect, a client device 102 is a specific-purpose client device designed for a specific-purpose (rather than a general purpose). In a preferred aspect, a client device 102 is not a conventional personal computer (PC). In one aspect, a specific-purpose client device may be designed to perform one or a few pre-defined, dedicated functions. For example, a specific-purpose client device may be designed to perform less than 10 dedicated functions, less than 5 dedicated functions, less than 3 dedicated functions, or 1 dedicated function. A specific-purpose client device may be, for example, a client device designed as a cashier machine at a department store, a client device designed to carry out specific tests or measurements, a client device designed to carry out a specific medical application for diagnosis and/or treatment of a patient, etc.

In one aspect, a server 112 may represent a computer, a laptop computer, a computing device, a database, an in-house server, a repository server, a remote management server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server) or a suitable device with a processor. In a preferred aspect, a server 112 is stationary. In another aspect, a server 112 can be mobile. In yet another aspect, a server 112 can be embedded. In certain configurations, a server 112 may be any device that can represent a client device. In a preferred aspect, the server 112 is not a client. In one aspect, a server 112 may include one or more servers, or functions of one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network for remote operations.

When a client device 102 and a server 112 are remote with respect to each other, a client device 102 may connect to a server 112 over a local area network 114 (e.g., a corporate network) and/or a wide area network 118 (e.g., a public network), for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other remote network connection. The local area network 114 or the wide area network 118 can be a wireless network, the Internet, an intranet or other remote network. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

In one aspect of the disclosure, a "client device" may be sometimes referred to as a client, a target client device, a target device, or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. In one aspect, devices placed on a client side (e.g., devices connected directly to a client device(s) or to one another using wires or wirelessly (e.g., using Bluetooth having a short range such as 35 feet or Infrared)) may be referred to as local devices with respect to a client device and remote devices with respect to a server. Similarly, devices placed on a server side (e.g., devices connected directly to a server(s) or to one another using wires or wirelessly (e.g., using Bluetooth having a short range such as 35 feet or Infrared)) may be referred to as local devices with respect to a server and remote devices with respect to a client device.

In some aspects, the server 112 may comprise a remote management server 104 and/or a repository server 106. Although the server 112 is shown as comprising two servers 104, 106, fewer or additional servers, such as a DHCP server, a DNS server, an application server, or the like, may be placed inside or outside of server 112. For example, remote management server 104 can optionally include a pre-boot execution (PXE) server 107, which can include a DHCP proxy 108 and a TFTP service 109, for providing PXE boot services. The remote management server 104 can further include a management service 110, a management console 111, and a firmware configuration storage 113. In some aspects, one or more of these servers may be combined together as a single server. In some aspects, the server 112 may also be referred to as an in-house server because the server 112 may primarily operate to communicate with clients 102a and 102b over a private network such as the local area network 114.

In some aspects, at least a portion of the server 112 may be accessible from the wide area network 118. For example, as shown in FIG. 1, the remote management and repository servers 104, 106 are accessible from the wide area network 118. Thus, the client devices 102c and 102d may communicate with the server 112 (e.g., the remote management and/or repository servers 104, 106) via the wide area network 118.

In other aspects, one or more public servers (not shown) connected to the wide area network 118 may be accessible to client devices 102c and 102d through a public network such as wide area network 118, and/or to client devices 102a and 102b through wide area network 118, server 112, and local area network 114. The one or more public servers may perform functions substantially similar to any of the functions described herein as being performed by server 112 and/or remote management and repository servers 104, 106.

According to various aspects of the subject technology, the clients 102 may each be running a Windows-based operating system (e.g., Windows Embedded Compact, Windows Embedded Standard (WES), Windows Embedded Enterprise, Windows Embedded POSReady, Windows Embedded NAVReady, Windows Embedded Server, etc.) or other suitable embedded operating system. Some or all of the clients 102 may alternatively be running a Linux-based or other type of operating system.

FIGS. 2A and 2B are conceptual block diagrams illustrating examples of client device 200a and 200b, which may function as any one of client devices 102a, 102b, 102c, or 102d of FIG. 1.

A computing device 200a or 200b (referred generally as computing device 200) may include a processing system 202. A processing system may include one or more processors. The processing system 202 is capable of communication through a bus 204 with other structures or devices. It should be understood that communication means other than busses can be utilized with the disclosed configurations.

The processing system 202 may include a general-purpose processor or a specific-purpose processor for executing instructions. The processing system 202 can communicate with a machine-readable medium 206 for storing data and/or instructions for software programs. The machine-readable medium 206 may be internal to the processing system 202 (e.g., on-board memory), or external to and in communication with the processing system (as shown). The machine-readable medium 206 may include instructions executable by the processing system 202 to control and manage access to the various networks, as well as provide other communication and processing functions. The instructions may also include instructions executable by the processing system 202 for various user interface devices 208, such as a display and/or keypad. The processing system 202 may include a communication interface 210, which may include one or more input, output, or bi-directional ports used for communication with external devices or networks.

The processing system 202 may be implemented using software, hardware, or a combination of both. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 202.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a media player, an HTTP server, a web server) or by a processing system (e.g., a processing system of a media player, an HTTP server, or a web server). Instructions can be, for example, a computer program including code.

A machine-readable medium can be one or more machine-readable media. A machine-readable medium (e.g., 206) may include storage external to a processing system, such as a random access memory (RAM), a static random access memory (SRAM), a flash memory, a read only memory (ROM), a programmable read-only memory (PROM), an erasable PROM (EPROM), a complementary metal-oxide-semiconductor (CMOS) memory, a BIOS computer microchip, registers, a hard disk, a removable disk, a CD-ROM, a DVD, and/or any other suitable storage device. A machine-readable medium 206 may also have a volatile memory and a non-volatile memory. A machine-readable medium 206 may include storage integrated into a processing system, such as might be the case with an application specific integrated circuit (ASIC). A memory may be a machine-readable medium (e.g., 206) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer-readable storage medium, or a non-transitory computer-readable storage medium.

The machine readable medium 206 can store firmware components (referenced generally as firmware), such as one or more of a master boot record (MBR) 212, non pre-boot execution (non-PXE) files 214, a basic input/output system (BIOS) 216, a complementary metal-oxide-semiconductor (CMOS) RAM 218, and/or an operating system (O/S) 220. The firmware components may be used by the processing system 202 to provide the basic computing environment used by the various software and hardware programs and devices running on the client device 102.

In one example, the machine readable medium 206 of computing device 200a includes non-PXE files 214, including a firmware update module (FUM) 222 (FIG. 2A). In the example, the processing system 202 may be configured, upon boot-up, to firstly load and execute computer-readable instructions stored in the BIOS 216 and/or CMOS 218. The BIOS 216 and/or CMOS 218, in turn, may provide a basic input/output execution environment enabling the processing system 202 to selectively boot the computing device 200a from a memory partition storing the non-PXE files 214, or from a memory partition storing the O/S 220. If the device 200a is booted from the non-PXE files 214, the boot sequence can include running of the FUM 222.

In another example, the machine readable medium 206 of computing device 200b does not include non-PXE files. Instead, computing device 200b includes a PXE module 224 (FIG. 2B). Upon boot-up of the device 200b, the BIOS 216 and/or CMOS 218 enable the processing system 202 to selectively boot the computing device 200b using the PXE module 224, or from a memory partition storing the O/S 220. If the device 200b is booted using the PXE module 224, the boot sequence can include connecting to a PXE server (e.g., server 107) and, based on boot instructions retrieved from the PXE server, retrieving and executing a firmware update module on the processing system 202.

The machine readable medium 206 can include multiple storage devices, and/or multiple partitions within a single storage device. In general, the machine readable medium may include at least a non-volatile memory (e.g., a flash drive, hard-disk, or the like), a temporary memory (e.g., RAM, or the like), and solid-state memory devices storing each of the BIOS and CMOS. In a first example, in a client device 200a running the Windows XP Embedded (Windows Xpe) operating system (O/S), the non-volatile memory of the client device may include a first "WFS" partition for storing device constants which need to be preserved across firmware updates and having a size of 1 megabyte (MB), a second "O/S" partition for storing the O/S and having an NTFS (new technology file system) file system, and a third "Non-PXE" partition functioning as a non pre-boot execution environment (non-PXE) partition having a FAT32 (file allocation table 32) file system and storing a firmware update module (FUM):

Windows Xpe:

| WFS<br>(1-MB of File System) | O/S partition<br>(NTFS) | Non-PXE partition<br>(FAT32-optional) |
| --- | --- | --- |

In a second example, in a client device 200a running a Windows Embedded Standard 2009 O/S, the non-volatile memory of the client device may include a first "WFS" partition for storing device constants which need to be preserved across firmware updates and having a size of 1 megabyte (MB), a second "Non-PXE" partition functioning as a non pre-boot execution environment (PXE) partition of size 16 MB, having a FAT32 (file allocation table 32) file system, and storing a FUM, and a third "O/S" partition for storing the O/S and having an NTFS (new technology file system) file system:

Windows Embedded Standard 2009:

| WFS<br>(1-MB of File System) | Non-PXE partition<br>(16-MB FAT32 file system) | O/S Partition<br>(NTFS) |
| --- | --- | --- |

In a third example, in a client device 200a running a Windows Embedded Standard 7 O/S, the non-volatile memory of the client device may include a first "Non-PXE" partition functioning as a non pre-boot execution environment (PXE) partition of size 16 MB, having a FAT32 (file allocation table 32) file system, and storing a FUM, and a second "O/S" partition for storing the O/S and having an NTFS (new technology file system) file system:

Windows Embedded Standard 7:

| Non-PXE partition (16-MB FAT32 file system) | O/S Partition (NTFS) |
|---|---|

In a fourth example, in a client device 200b running a Linux or Windows Embedded Compact (CE) O/S, the non-volatile memory of the client device may include a single or multiple partition(s) for storing the O/S and client devices. In particular, the client device 200b may not include a non-PXE partition, and may retrieve the FUM from a PXE boot server when firmware updates are scheduled A communication interface 210 may be any type of interface and may reside between any of the components shown in FIG. 2. A communication interface 210 may also be, for example, an interface to the outside world (e.g., an Internet network interface), and may enable processing system 202 of client device 102 to communicate with servers and/or other devices over a network (such as networks 114, 118). The communication interface 210 can include one or more transceivers, and each transceiver may include a receiver and a transmitter. A functionality implemented in a processing system 202 may be implemented in a portion of a communication interface 210, a portion of a machine-readable medium 206, or a portion of a user interface 208, and vice versa.

A PXE module 224 (shown in FIG. 2B) can optionally be included in the client devices 200a or 200b. The PXE module 224 can be used to boot the client device 200 using boot files stored on a PXE server, such as PXE server 107. In one aspect, a computing device may include only some or all of the elements shown in FIG. 2A or 2B. A computing device may include other elements not shown in FIG. 2A or 2B. A computing device may include more than one of the same elements.

In order to update the firmware on a client device 200, the client device 200 can include a firmware update module (FUM) 222 (or firmware updater) which is configured to perform firmware updates on the client device 200. Alternatively, a remote management server 104 can include a PXE server 107 which stores the firmware update module (FUM), and which is transmitted to and executed on the client device 200 during a PXE boot sequence. The FUM 222 can include hardware, software, or a combination of hardware and software, and is generally configured for execution on the client device 200. In one aspect, the FUM 222 includes a kernel (e.g., a Linux kernel), which can be booted on all the client device 200 hardware, and a firmware update application (referenced herein as "ImagingAgent.exe"), which runs as the first application process after the kernel boots.

The firmware update module (FUM) 222 may take different forms, or be stored in a different location, depending on the type of client device 200 it is installed on. In some types of client devices 200, such as client devices 200a that include non-PXE files 214 (non-PXE supported devices) including FUM 222, the FUM 222 can reside on a flash memory, or other memory of the client device 200a. In such devices, the client device can load the FUM 222 during boot-up when a non-PXE partition is selected as a first boot partition (e.g., by selecting the non-PXE partition as a first boot partition in a bootloader of the client device, such as in a GRUB bootloader configuration file). In other types of client devices, such as client devices 200b that do not have a non-PXE partition (devices without the non-PXE component/files), the FUM may reside in a storage of a remote PXE server (such as PXE server 107). In such devices, the FUM can be loaded on to the client device 200b using a network boot method. The network boot method may involve booting the device using a PXE module 224, and causing the PXE module 224 to retrieve the FUM from the PXE server as part of the PXE boot process.

In either type of client device 200, when the firmware update module (FUM) 222 boots up, the FUM calls the firmware update application (also referred to as "ImagingAgent"). The firmware update application discovers the remote management server 104, for example by using methods such as a DHCP option tag, a DNS service record lookup, a DNS name lookup, or the like. Once the firmware update application discovers the server 104, the application attempts to check-in to the server 104 using device information such as a media access control (MAC) identification number (ID) or address, an internet protocol (IP) address, or other appropriate identifier for the client device 200. The remote management server 104 responds to the application with a firmware update configuration file (such as an XML file, referenced herein as a "command.xml" file) if there is a firmware update scheduled or available for that client device 200. If no firmware update is scheduled or available for the client device 200, the remote management server 104 will not give the firmware update configuration file. If no firmware update configuration file is received, the firmware update module in a non-PXE client device 200a may change the boot order to set the partition storing the operating system (i.e., the OS partition) as the first boot partition, and the firmware update module may reboot the client device 200a.

The firmware update process will now be described in more detail with respect to the flow diagram of FIG. 3. FIG. 3 is a flow diagram 300 illustratively showing a process for updating firmware on a client device.

The firmware update process begins with operation 301, in which the firmware update process is initiated. The firmware update process can be initiated either locally on a client device, or remotely on a remote management server. Various methods for initiating the firmware update process for various types of client devices are described in more detail in relation to FIGS. 5A-5C below. In general, the initiation of the firmware update process results in a firmware update module running on a client device. Once the firmware update process is initiated, the firmware update module proceeds to operation 303.

In operation 303, the firmware update module discovers the remote management server or software (e.g., a remote management software residing on the remote management server 104) and establishes a communication session with the remote management server/software to receive firmware update details from the remote management server/software, such as an address for or other information regarding a repository server (e.g., repository server 106), information about a firmware update package, and/or information about firmware components which are to be updated. On successful discovery of the remote management server/software, the firmware update module running on the client device 102 checks-in to the remote management server (RMS) 104 by sending to the RMS 104 device information such as a MAC ID, an IP address, or other identifier or information for the client device.

In response to the client device checking in, operation 305 is performed. In particular, the RMS checks whether any firmware updates are scheduled or available for the particular client device having checked-in. In particular, the RMS may check whether a firmware configuration storage (e.g., firmware configuration storage 113 of FIG. 1) includes any firmware update records associated with the particular client device having checked-in, and whether any of the firmware update records are scheduled for a current or past time. In other exemplary aspects, the checking may additionally or alternatively involve determining whether any firmware update records are available for client devices of the same type as the client device having checked-in, for client devices running a firmware (e.g., MBR, BIOS, CMOS, non-PXE files, and/or O/S) of the same type or version as the client device having checked-in, or the like. If the RMS determines that a firmware update is available for the particular client device (or for the type of device, type of firmware, or version of firmware), the RMS sends a firmware update configuration file (e.g., a command.xml file) to the client device in response to the client device's checking in. The client device receives the firmware update configuration file, and operation proceeds to operation 307. If the RMS determines that a firmware update is not available, the firmware update process ends at operation 305.

In operation 307, the client device parses the received firmware update configuration file, in order to identify each of the component updates listed in the file including the package name and package size corresponding to the component update. For example, a firmware update configuration file can include a component update for each of a MBR, a BIOS, a CMOS, non-PXE files, and/or an O/S. The client device may also identify the repository path, or other location from which the component package for each update can be retrieved, in the firmware update configuration file. The client device creates a list of the package names and corresponding package sizes that need to be downloaded in order to perform the firmware update process.

In operation 309, the client device validates each of the firmware update packages identified in operation 307. In particular, the client device checks whether each package included in the list can be found in the repository path, by checking whether the repository path has a package having the same package name and same corresponding package size identified in the list. If the client device finds any mismatch between the listed package names and sizes and the package names and sizes found in the repository path, the client device reports an error to the remote management server, stops the firmware update process, and reboots the client device. However, if all listed packages and corresponding packages included in the repository path match, the client device proceeds to operation 311.

In operation 311, the client device downloads from the repository path the packages for each of the mandatory components identified in the firmware update configuration file. The mandatory components may include the MBR, non-PXE, BIOS, and CMOS components, for example. The client device may additionally calculate a CRC for each downloaded package, and compare the calculated CRC with the CRC included for the package in the firmware update configuration file. If any of the compared CRCs do not match, the client device may report an error to the remote management server, stop the firmware update process, and reboot the client device. However, if all of the compared CRCs match, control proceeds to operation 313. In general, operation 311 is not performed with respect to updates relating to the O/S because installation packages for O/S updates are very large in size, and client devices may therefore not have sufficient storage space and/or processing power to store the O/S update package and calculate the package's CRC prior to installation.

However, operation 313 can generally be performed with respect to all other firmware components, including all mandatory firmware components such as the MBR, CMOS, BIOS, and non-PXE files.

In operation 313, the client device performs a backup of all of the files corresponding to mandatory firmware components that are installed on the client device. For example, the client device may copy the mandatory components firmware files (e.g., firmware files for the MBR, BIOS, CMOS, and non-PXE files) into a RAM of the client device.

In operation 315, the client device determines an installation order for each of the firmware components to be updated. In particular, based on an order of preference, the client device may establish the order in which each of the firmware updates (e.g., updates to the MBR, non-PXE files, O/S partition, BIOS, and/or CMOS) should be performed. In one example, the client device may firstly install the MBR, followed by the non-PXE files, the O/S, the BIOS, and finally the CMOS.

In operations 317-321, each of the firmware updates are sequentially selected and installed on the client device based on the installation order determined in operation 315. Upon beginning and/or successfully completing the installation of an update, the client device can send a start or completion indication identifying the update to the remote management server, so as to keep the remote management apprised of the client device's progress in installing the firmware update(s). Upon encountering a failure of any of the updates, the client device sends an appropriate error report message to the remote management server.

In an exemplary aspect, the client device may firstly install an update package for the MBR. If the update fails, the client device restores the backup copy of the MBR on the client device, and causes a reboot of the device. If the MBR update is successful, the client device proceeds to update the non-PXE components, if any. If the update of the non-PXE files experiences a failure, the client device restores the client device by retrieving the MBR and non-PXE components stored in the backup copies. If the update of the non-PXE files is successful, the client device may set the non-PXE partition as the active boot partition. Next, the client device updates the O/S partition. If any failure occurs during update of the O/S partition, and if the client device is a non-PXE device, the client device will reboot and, upon boot up, boot from the non-PXE partition so as to retry the update process. If any failure occurs during the update of the O/S partition and the client device is a PXE device, the client device will reboot and, upon boot up, boot through the PXE process to retry the update process again. If no failure occurs during updating of the O/S partition, the client device sends a message indicating the update progress (e.g., by indicating the percentage of the update that has been completed) to the remote management server upon completing each 25% increment of the update. Upon successfully completing the O/S update, the client device updates the BIOS. If any failure occurs during updating of the BIOS, the client device recovers the BIOS using the backup copy of the BIOS image, and ends the update process. Finally, upon successfully completing the BIOS update, the client device updates the CMOS. If any failure occurs during updating of the CMOS, the client device recovers both the BIOS and the CMOS using the backup copy of the BIOS and CMOS image, and ends the update process.

Figure 4A:
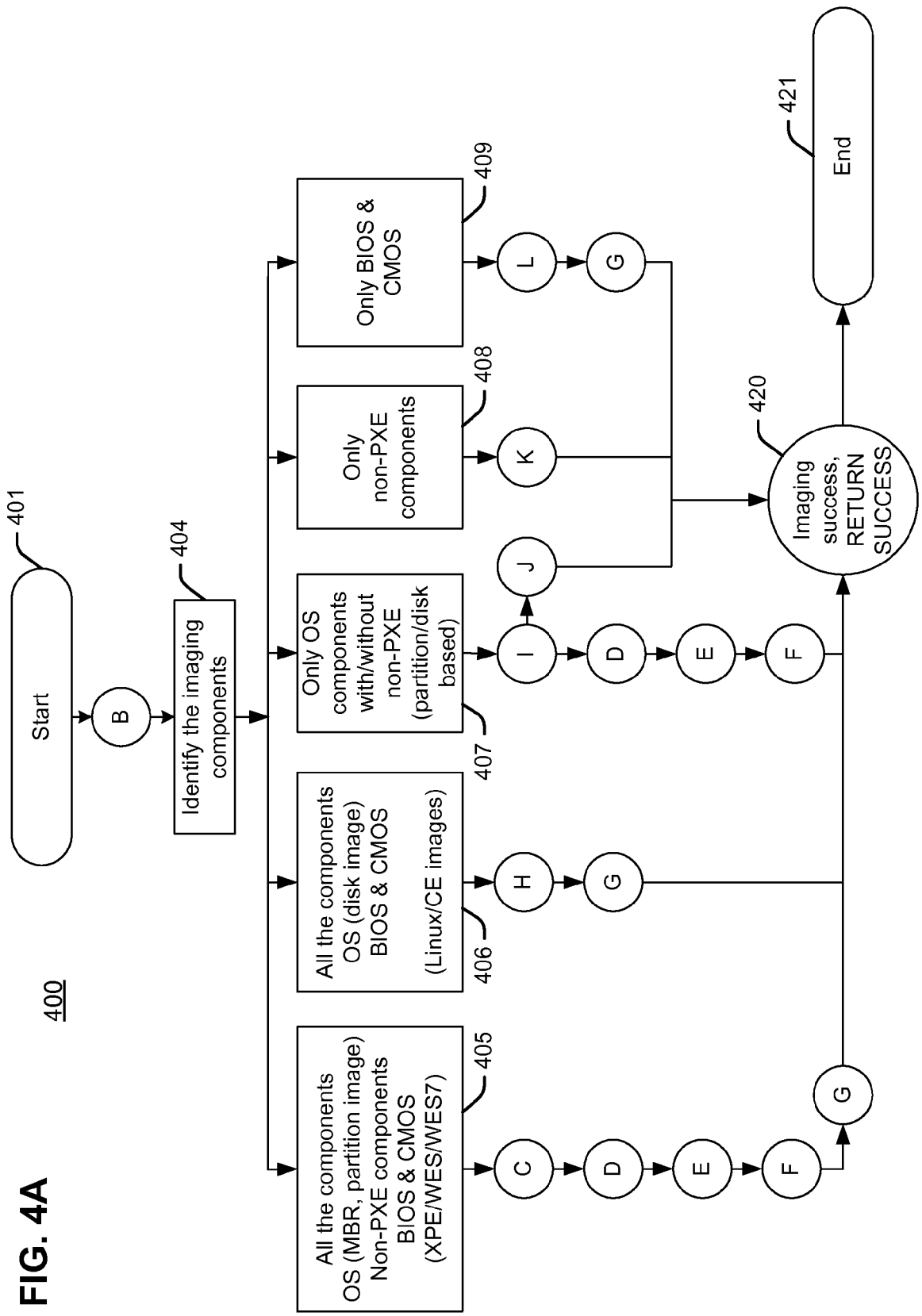
FIGS. 4A-4L are flow diagrams showing an exemplary process for updating firmware on a client device, in accordance with various aspects of the subject technology.

FIGS. 4A-4L show a flow diagram of an exemplary process 400 for updating firmware on a client device. FIG. 4A shows the general structure of the process, while each of FIGS. 4B-4L shows a part of the process in more detail.

Figure 4B:
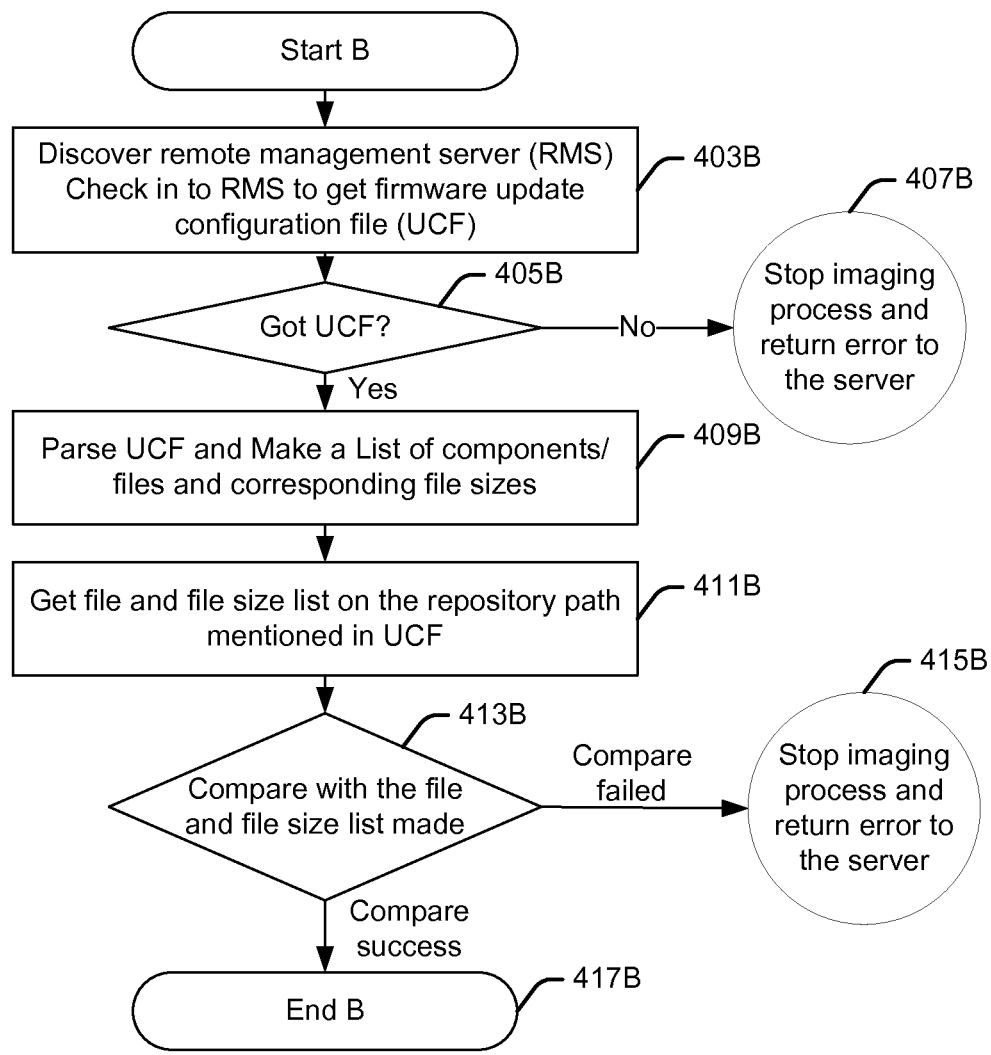
Figure 4C:
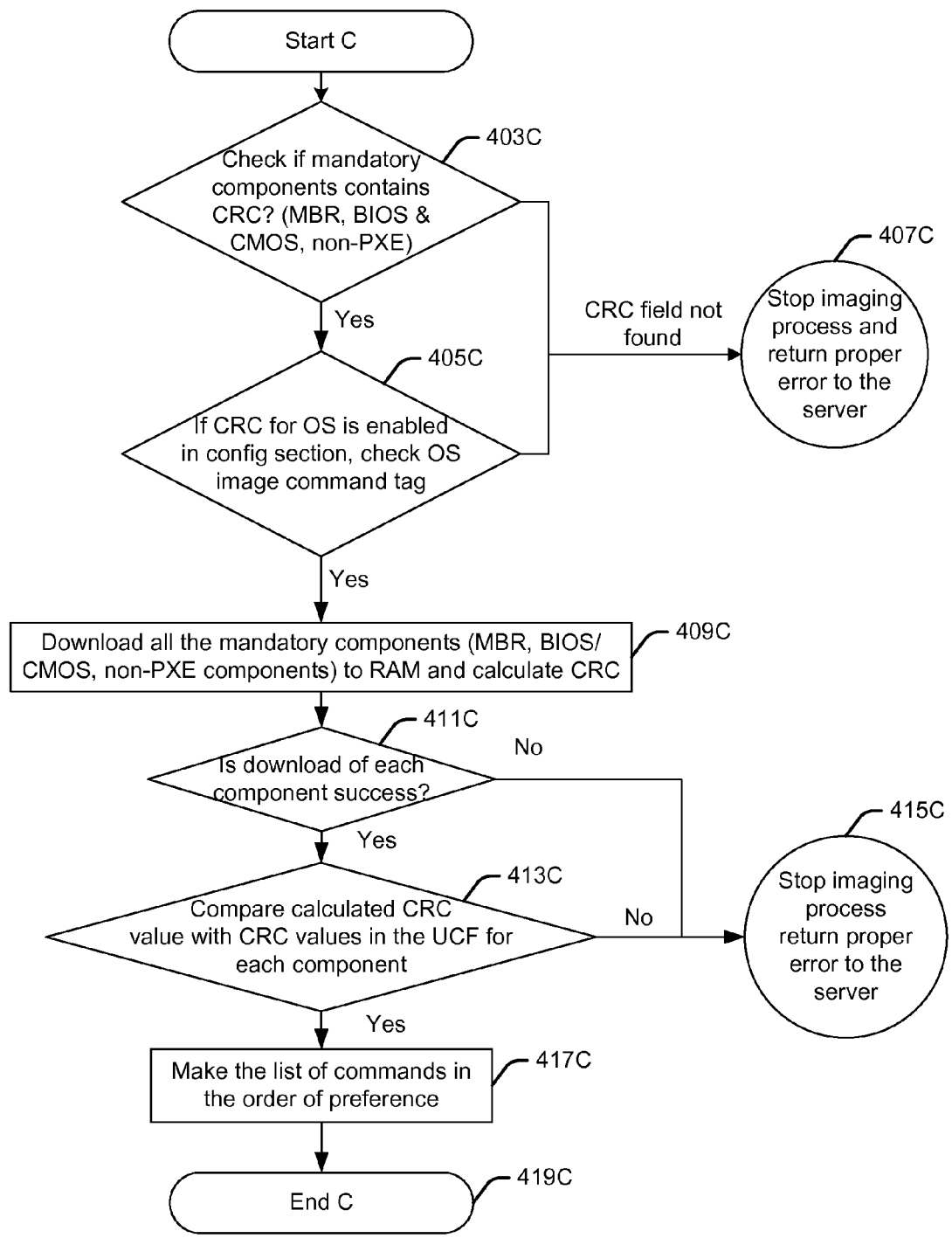

The process 400 begins at operation 401 with the initiation of the firmware update process. More detail on initiation of the firmware update can be found in FIGS. 5A-5C. Following initiation of the update process, the process "B" shown in FIG. 4B is completed. According to the flow diagram of FIG. 4B, the firmware update application running on the client device causes the client device to discover the remote management server (RMS) 104 (operation 403B) by sending handshake request message using the IP address (or other address or identifier for the RMS) stored locally in the client device storage memory (e.g., in a flash memory of the client device), or to an address for the RMS 104 received in response to a DHCP option tag request sent to a DHCP proxy 108 of a PXE server 107. Once the RMS 104 is discovered, the firmware update application sends check-in information to the RMS (operation 403B), including device information such as a MAC ID, an IP address, or other identifier or information for the client device. In response to sending the check-in information, the firmware update application waits to receive a firmware update configuration file (UCF) from the RMS (operation 405B). In general, the RMS sends a firmware update configuration file (such as a "command.xml" extensible markup language (XML) file) identifying each of the component updates and associated update package and package size to the client device if an update is scheduled or available for the client device identified at check-in. If no firmware update configuration file is received, or if an indication that no firmware update configuration file is available for the client device is received, the firmware update application stops the imaging process and return an error message to the RMS server (operation 407B).

However, if a firmware update configuration file is received, the firmware update application parses the received configuration file in order to assemble a list of all the component updates identified in the configuration file, and of the package name and package size associated with each component update (operation 409B). The firmware update application then contacts a repository server (e.g., repository server 106) to determine whether packages having the same package names and package sizes included in the list are stored in the repository server (operation 411B). For example, the firmware update application may identify the repository server based on an address for the repository server retrieved from the firmware update configuration file, or retrieved from another appropriate location. In one aspect, the firmware update application requests from the repository server a list of the package names and sizes stored on the repository server, and compares the assembled list with the received list. If all of the package names and corresponding sizes in the assembled list match package names and sizes included in the received list (operation 413B), the comparison is a success and the firmware update application completes the process "B" successfully (operation 417B). However, if any of the package names and/or corresponding sizes in the assembled list are not included in received list or do not match package names and sizes in the received list (operation 413B), the firmware update application stops the imaging process and return an error to the RMS (operation 415B).

Following completion of the process of FIG. 4B, the operating flow proceeds to operation 404 (FIG. 4A), in which the firmware update application identifies each of the component updates indicated in the firmware update configuration file. Based on the identified updates, the firmware update application proceeds to one of operations 405, 406, 407, 408, or 409. In particular, if the O/S (including the MBR and partition image), the non-PXE files, and the BIOS and CMOS are to be updated, the firmware update application proceeds to operation 405. If the O/S (including a disk image) and the BIOS and CMOS are to be updated, the firmware update application proceeds to operation 406. If only the O/S components (with or without non-PXE files, whether for a partition or disk image) are to be updated, the firmware update application proceeds to operation 407. If only the non-PXE components need updating, the firmware update application proceeds to operation 408. And if only the BIOS and CMOS need to be updated, the firmware update application proceeds to operation 409.

Figure 4D:
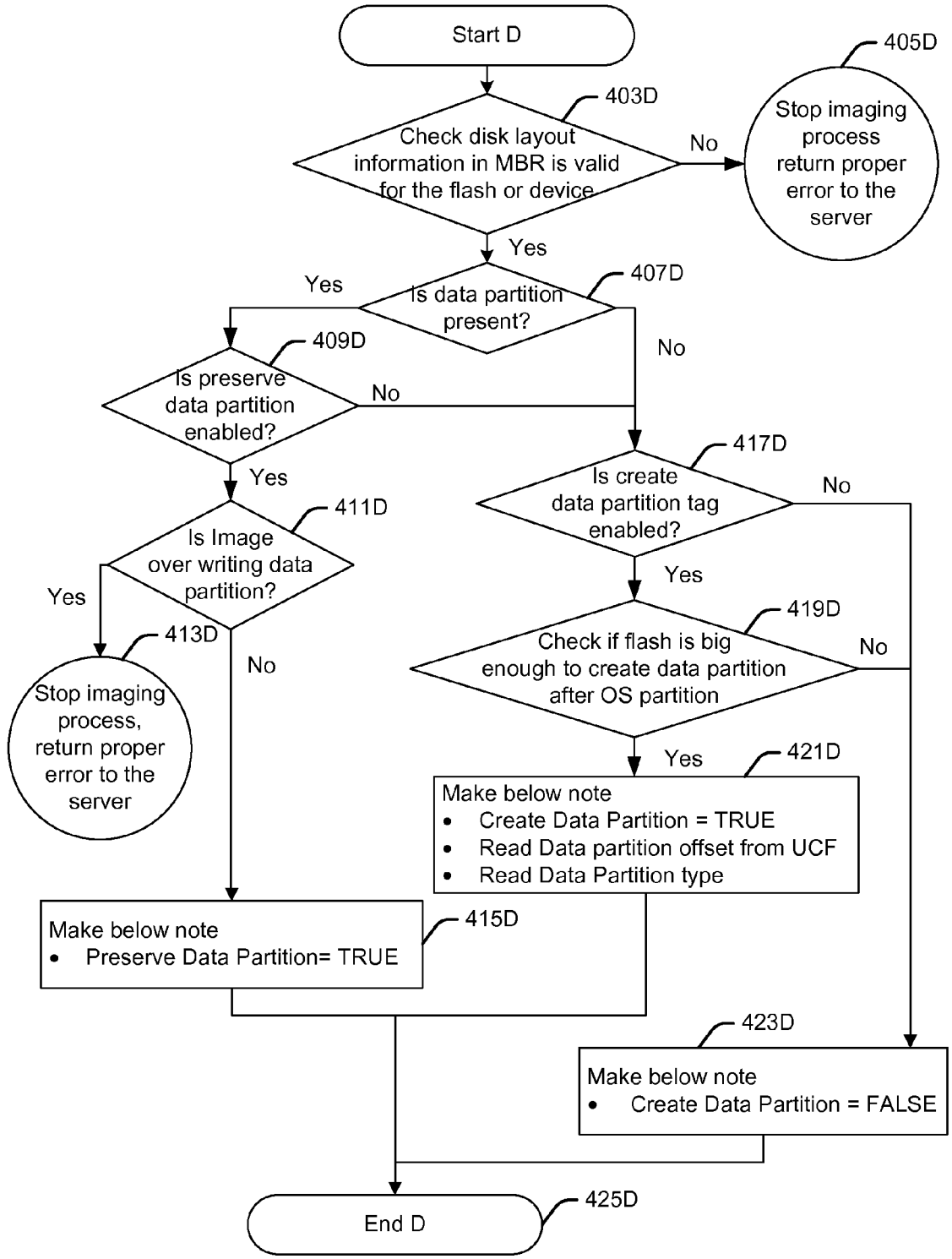

Following operation 405, the processes "C", "D", "E", "F", and "G" respectively shown in FIGS. 4C-4G are sequentially completed. According to process "C" shown in the flow diagram of FIG. 4C, the firmware update application checks whether each of the mandatory components included in the firmware update configuration file for the firmware update (including the MBR, BIOS, CMOS, and non-PXE files) has an associated cyclic redundancy code (CRC) included in the firmware update configuration file (operation 403C). If one or more CRC is not found, the firmware update application stops the firmware updating process and returns an error to the RMS (operation 407C). In addition, if the firmware update configuration file indicates that CRC-based verification of the O/S is enabled, the firmware update application further checks whether a CRC for the O/S image is included in the firmware update configuration file (operation 405C). If the CRC for the O/S image is not found, the firmware update application stops the firmware updating process and returns an error to the RMS (operation 407C). If all required CRCs are found, the firmware update application proceeds to download the mandatory components (MBR, BIOS, CMOS, and non-PXE components) to a memory (e.g., a RAM) of the client device, and to calculate the CRC for each component (operation 409C). If the download of any of the mandatory components fails (operation 411C), and/or if any of the calculated CRCs do not match the CRCs included in the firmware update configuration file (operation 413C), the firmware update application stops the imaging process and returns an error to the server (operation 415C). If the downloads and CRC checks are successful (operations 411C and 413C), the firmware update application orders the list of component updates in an order of preference (operation 417C). For example, the component updates may be ordered such that the MBR is installed first, followed by the non-PXE files, the O/S, and finally the BIOS and CMOS. Once the updates are ordered, the process "C" ends (operation 419C), and operation proceeds to process "D" (FIG. 4D).

According to process "D" shown in the flow diagram of FIG. 4D, the firmware update application performs operations relating to the disk layout of the non-volatile memory (e.g., disk, flash, or other memory including partitions for storing the O/S and/or other firmware components) of the client device. The firmware update application begins by checking whether the disk layout information defined in a downloaded master boot record (MBR) file (e.g., a MBR update file for updating a mandatory component, such as a MBR file downloaded in operation 409C or 407I) is valid for the device (or for the device's disk, such as a flash drive) (operation 403D). If the disk layout is not valid, the imaging process is stopped and an error is returned to the RMS (operation 405D). If the disk layout is valid, the firmware update application proceeds to check whether a data partition is present in the non-volatile memory of the client device (operation 407D). If a data partition is present, and if the firmware update configuration file indicates that the data partition should be preserved (e.g., if the "Preserve Data Partition" flag is enabled) (operation 409D), the firmware update application checks whether the installation of the firmware component updates would overwrite the data partition (operation 411D). If the installation would overwrite the data partition, the imaging process is stopped and an error is returned to the RMS (operation 413D). If the installation would not overwrite the data partition, the firmware update application sets a flag for "Preserve Data Partition" to TRUE (operation 415D), and process "D" ends (operation 425D). If no data partition is present (operation 407D), or if the firmware update configuration file does not indicate that the data partition should be preserved (operation 409D), the firmware update application checks whether the firmware update configuration file includes a tag for creating a data partition (operation 417D), and whether the non-volatile memory (e.g., a disk memory, or a flash memory) of the client device is large enough to create a data partition after the O/S partition (operation 419D). If a data partition is to be created, and if the non-volatile memory is large enough to create a data partition, the firmware update application sets a flag for "Create Data Partition" to TRUE, reads a data partition offset from the firmware update configuration file, and reads a data partition type from the firmware update configuration file (operation 421D) and process "D" ends (operation 425D). If no data partition is to be created, or if the non-volatile memory is not large enough to create a data partition, the firmware update application sets a flag for "Create Data Partition" to FALSE (operation 423D) and process "D" ends (operation 425D). Following the completion of process "D", operation passes to process "E" (FIG. 4E).

Figure 4E:
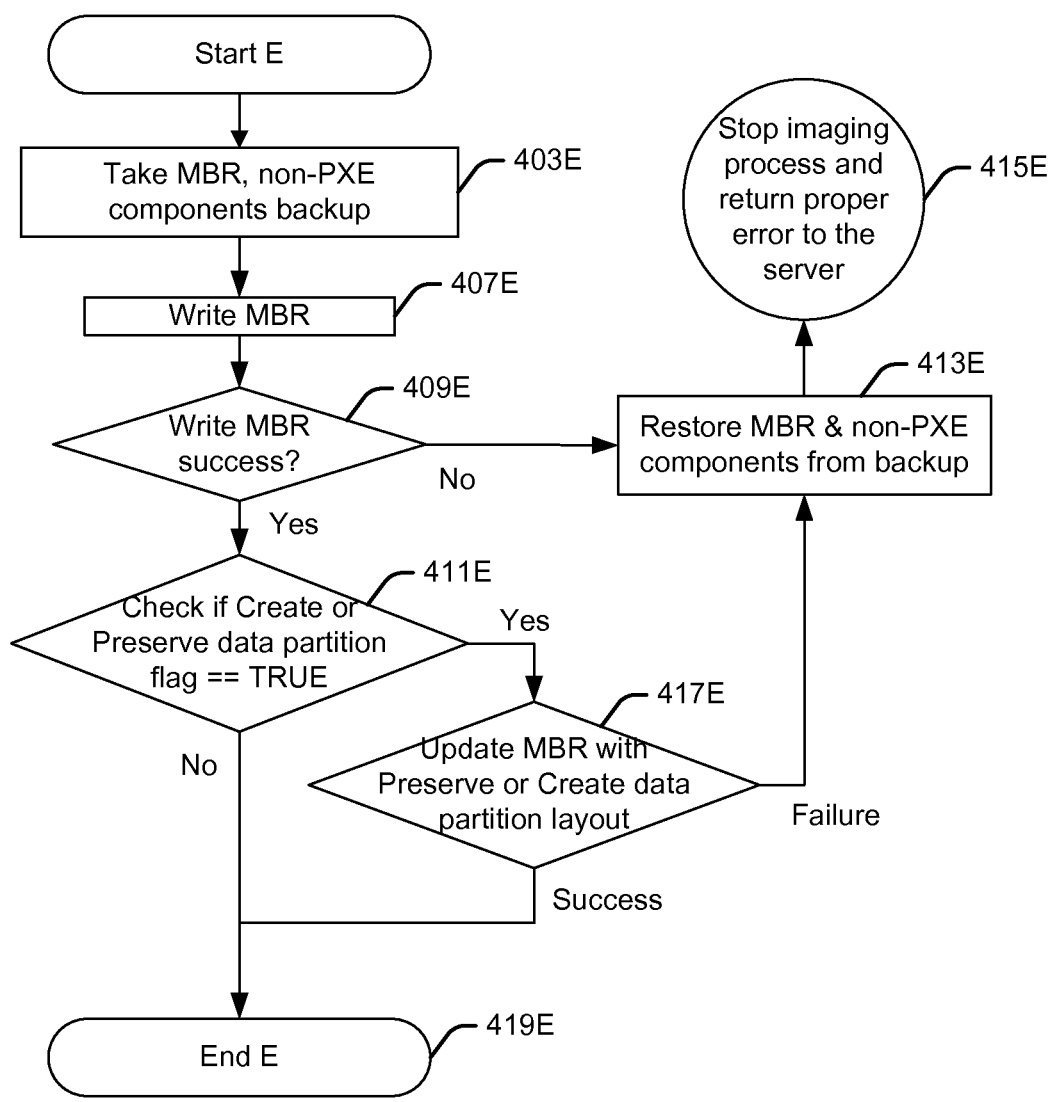

According to process "E" shown in the flow diagram of FIG. 4E, the firmware update application makes a back up copy of the MBR and non-PXE components (operation 403E), for example by copying these components into a temporary memory (e.g., RAM) of the client device. The firmware update application then writes the MBR (if no MBR was previously stored in the non-volatile memory of the client device), or overwrites the MBR (if a MBR was previously stored in the non-volatile memory of the client device) with the updated MBR from the component package downloaded from the repository server (operation 407E). If any errors occur during the writing of the MBR (operation 409E), the old version of the MBR and of the non-PXE components are restored from the back-up copy of the components stored in the temporary memory (operation 413E), the imaging process is stopped, and an error is signaled to the RMS (operation 415E). If the MBR is successfully written to the non-volatile memory of the client device (operation 409E), the firmware update application checks whether either of the "Create Data Partition" or "Preserve Data Partition" flags are TRUE (operation 411E), and updates the newly written MBR with preserve or create data partition layout information (operation 417E). For example, the newly written MBR may be updated by retrieving preserve data partition layout information from the back-up copy of the MBR or retrieving create data partition layout information given in the firmware update configuration file, and updating the newly written MBR using the retrieved preserve data partition layout information or create data partition layout information. If neither the "Create Data Partition" or the "Preserve Data Partition" flags are TRUE (operation 411E), or once the MBR is successfully updated (operation 417E), the process "E" ends (operation 419E). Following the completion of process "E", operation passes to process "F" (FIG. 4F).

Figure 4F:
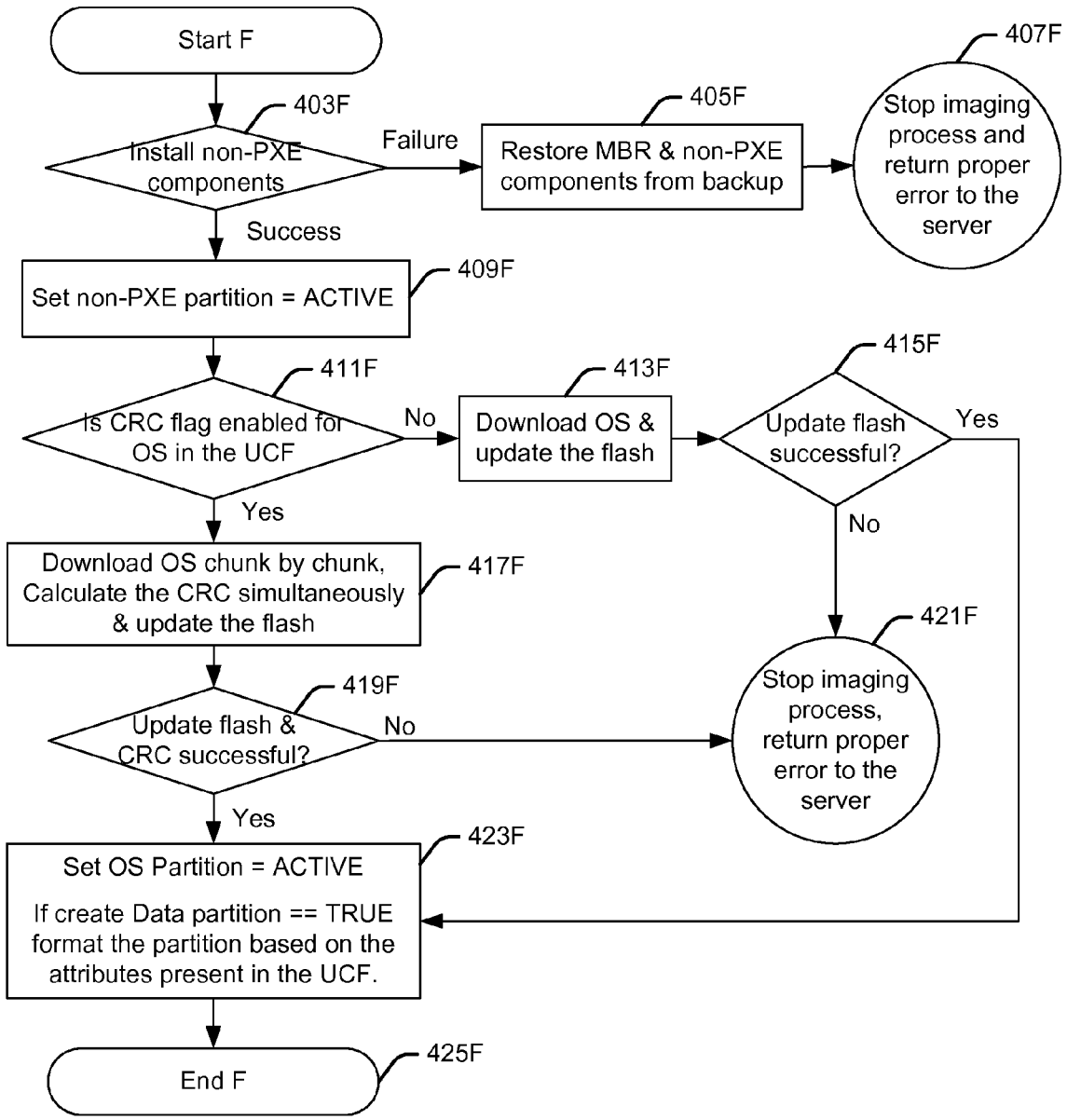

According to process "F" shown in the flow diagram of FIG. 4F, the firmware update application proceeds to install in the non-volatile memory of the client device the non-PXE components with the updated non-PXE files from the component package downloaded from the repository server (operation 403F). If the update is not successful, the old version of the MBR and of the non-PXE components are restored from the back-up copy of the components (operation 405F), the imaging process is stopped, and an error is signaled to the RMS (operation 407F). If the update is completed successfully, the firmware update application sets the non-PXE partition as the active boot partition (thereby making the O/S partition inactive for boot) prior to updating the O/S (operation 409F). The non-PXE partition is set as the active boot partition for the installation of the O/S such that, if any errors occur during the installation of the O/S which would block the client device from booting from the O/S partition, the client device will be able to boot-up from the non-PXE partition in order to retry the firmware update process on the next boot of the client device. Once the non-PXE partition is set as the active boot partition, the firmware update application determines whether the CRC flag is enabled for the O/S update indicated in the firmware update configuration file (operation 411F). If the CRC flag is set, the firmware update application proceeds to download the O/S update chunk by chunk (e.g., by downloading a chunk size that can fit into the available temporary memory on the client device), to calculate the CRC once each chunk is downloaded, and to update the non-volatile memory (e.g., flash memory of the client device) with the downloaded chunk (operation 417F). Once the final chunk is downloaded and updated in the non-volatile memory, the firmware update application determines whether the calculated CRC is equal to a CRC included in the firmware update configuration file, and further determines whether the updating of the non-volatile memory (e.g., a flash memory) was successful (operation 419F). If the CRC flag is not set (operation 411F), the firmware update application simply downloads the O/S and updates the non-volatile memory with the downloaded O/S (operation 413F). If either the update of the non-volatile memory with the downloaded O/S is not successful (operations 415F and 419F), and/or if the CRC check is not successful (operation 419F), the imaging process is stopped and an error message is sent to the RMS (operation 421F). If the update is successful, the O/S partition is set as the active boot partition (operation 423F). If the "Create Data Partition" flag is set to TRUE, the data partition is formatted in the non-volatile memory based on attributes included in the update configuration file, when the O/S update is completed. The "F" process then ends (operation 425F). Following the completion of process "F", operation passes to either process "G" (FIG. 4G) in the flow following operation 405 (FIG. 4A), or operation passes to operation 420 (FIG. 4A) in the flow following operation 407 (FIG. 4A).

Figure 4G:
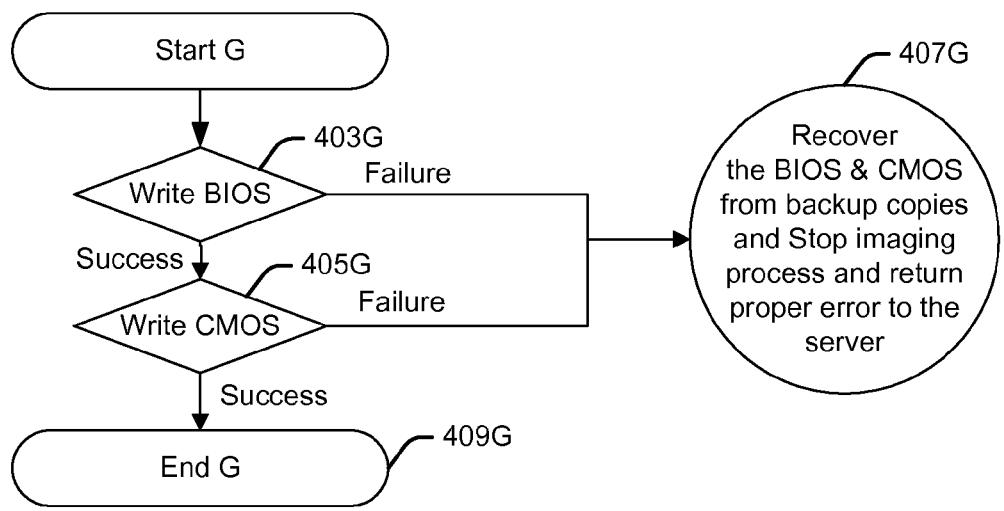

According to process "G" shown in the flow diagram of FIG. 4G, the firmware update application proceeds to install BIOS and CMOS updates. In particular, the firmware update application overwrites the BIOS on the client device with the updated BIOS from the component package downloaded from the repository server (operation 403G). The firmware update application then overwrites the CMOS on the client device with the updated CMOS from the component package downloaded from the repository server (operation 405G). If any error occurs during the writing of the BIOS or the CMOS, the old version of the BIOS and of the CMOS are restored from the back-up copies of the components, the imaging process is stopped, and an error is signaled to the RMS (operation 407G). If the BIOS and CMOS are successfully written (operation 409G), the firmware update application proceeds to operation 420 (FIG. 4A) in which a message is sent to the RMS indicating that the update of the firmware on the client device was a success and the update process ends in operation 421.

Figure 4H:
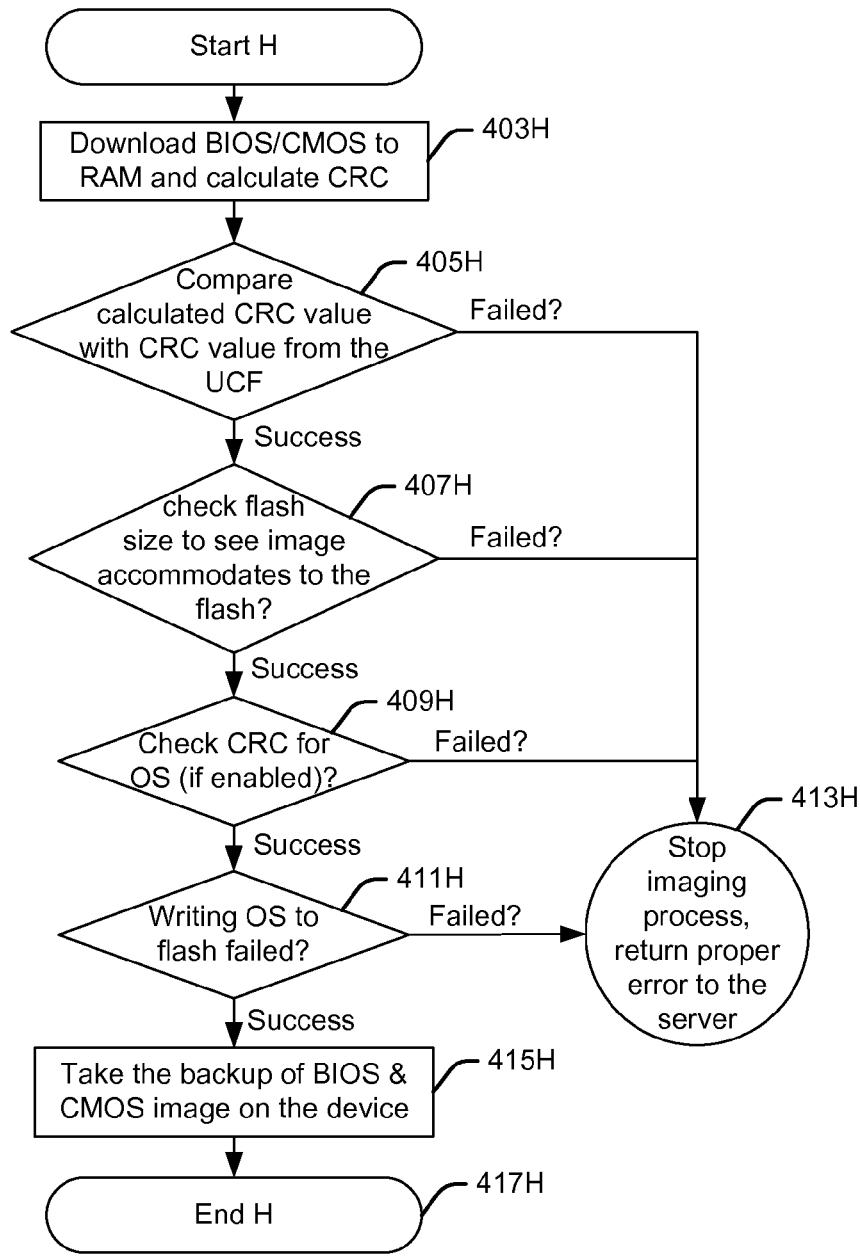
Figure 4I:
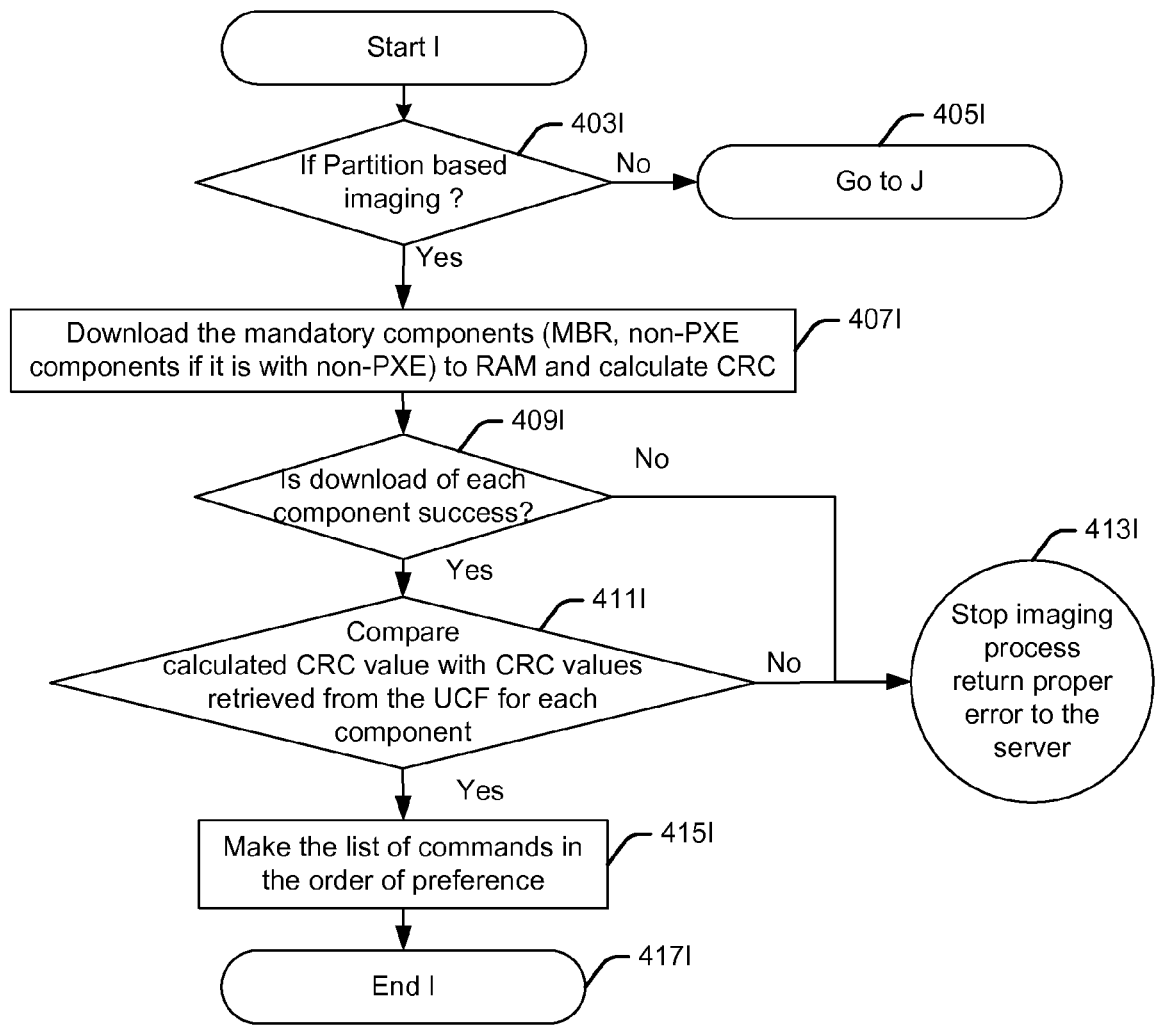
Figure 4J:
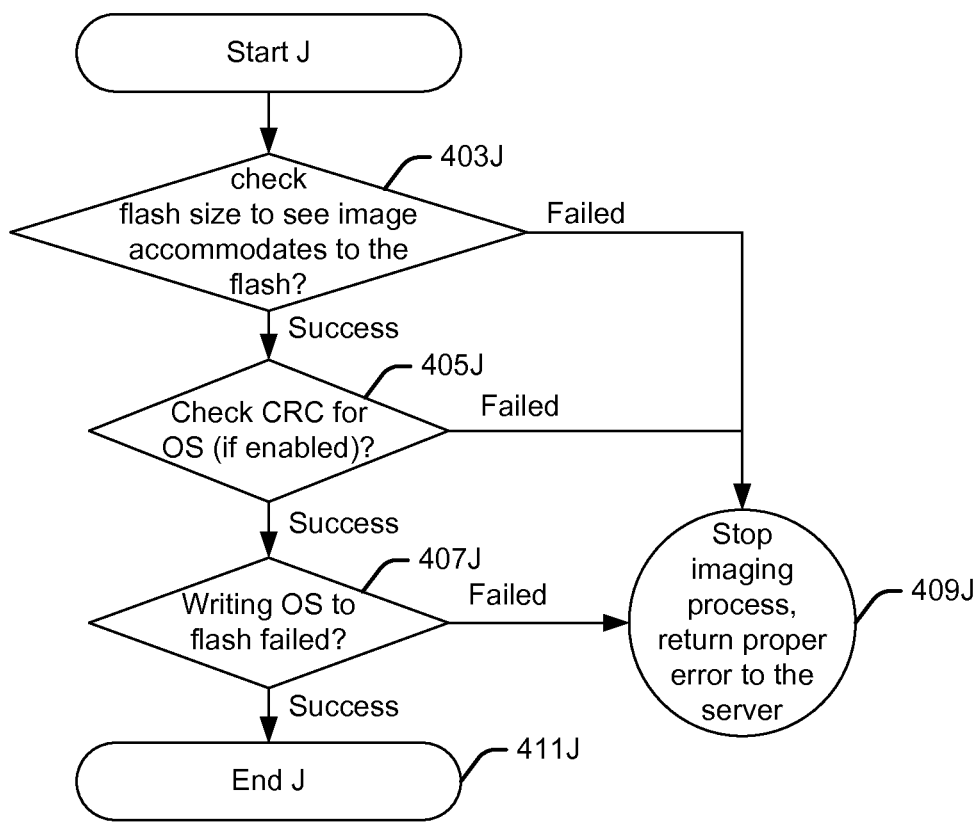

As shown in FIG. 4A, if the O/S (including a disk image format) and the BIOS and CMOS are to be updated, the firmware update application proceeds to operation 406. Following operation 406, the processes "H" and "G" respectively shown in FIGS. 4H and 4G are sequentially completed. These processes are generally completed for PXE enabled devices that do not have a non-PXE partition, and therefore do not need to update any non-PXE files, such as client devices running a Linux or Windows Embedded Compact O/S. The process "H" further generally does not store a backup copy of the O/S in temporary memory, and the client device may therefore not be able to recover and boot from its O/S partition if the downloaded disk image including the O/S and installed in the non-volatile memory is corrupted. However, the client device may be able to boot using a PXE module (e.g., PXE module 224) if the O/S is corrupted, and to reinitiate a firmware update process from the PXE boot process. According to process "H" shown in the flow diagram of FIG. 4H, the firmware update application begins by downloading the BIOS and CMOS update packages from the repository server to the temporary memory (e.g., RAM) of the client device, and calculating the CRC for each downloaded package (operation 403H). If either download is not successful, or if either calculated CRC does not match the CRC value indicated in the firmware update configuration file for the corresponding package (operation 405H), the imaging process is stopped and an error is returned to the RMS (operation 413H). If the download is successful and the calculated CRC values match the CRC values from the firmware update configuration file, the firmware update application checks whether the non-volatile memory (e.g., a flash memory) of the client device is sufficiently large to accommodate the disk image including the O/S (operation 407H). In particular, the firmware update application may retrieve, from the firmware update configuration file, an indication of the size of the disk image, and may compare the retrieved indication to the size of the non-volatile memory. If the size of the non-volatile memory of the client device is insufficient, the imaging process is stopped and an error is returned to the RMS (operation 413H). If the non-volatile memory is found to be of sufficient size, the firmware update application downloads the disk image containing the O/S and updates the non-volatile memory with the downloaded image. If the firmware update configuration file includes a CRC value for the disk image (operation 409H), the firmware update application calculates a CRC value for the disk image as it is downloaded, and compares the calculated CRC to the CRC value in the configuration file. If the CRC values do not match (operation 409H), or if an error is detected during download or writing of the disk image to the non-volatile memory (operation 411H), the imaging process is stopped and an error is returned to the RMS (operation 413H). If no CRC value is found or if the CRC values match, and if no error is detected during the download or writing of the disk image, the disk image download and update process is successful. The firmware update application then takes the backup of the BIOS and CMOS into the temporary memory (e.g., RAM) of the client device (operation 415H). The process "H" process then ends (operation 417H), and control passes to the "G" process (described in relation to FIG. 4G, above) to complete the updating of the BIOS and CMOS using the downloaded packages. If the BIOS and CMOS are successfully written (in process "G"), the firmware update application proceeds to operation 420 (FIG. 4A) in which a message is sent to the RMS indicating that the update of the firmware on the client device was a success and the update process ends in operation 421.

As shown in FIG. 4A, if only the O/S components (with or without non-PXE files, whether for a partition or disk image based update) are to be updated, the firmware update application proceeds to operation 407. Following operation 407, the processes "I" and either "J" or "D", "E", and "F" (respectively shown in FIGS. 4I, 4J, and 4D-4F) are sequentially completed. According to process "I" shown in the flow diagram of FIG. 4I, the firmware update application begins by determining whether the firmware update configuration file indicates whether the update is for a partition based update, or a disk image based update (operation 403I). In general, a partition based update process can provide separate update packages for the O/S, MBR, and/or non-PXE, and the separate update packages are used to install updates in appropriate non-volatile memory partitions of the client device containing O/S, MBR, and/or non-PXE files. A disk image based update can provide a single disk image update including the O/S, MBR, and/or non-PXE files, and the disk image update is used to overwrite the non-volatile memory (e.g., flash drive or hard disk) of the client device and thereby update the firmware.

In process "I", if the firmware update application determines that the configuration file corresponds to a partition based update (operation 403I), the mandatory components of the update (e.g., MBR, and non-PXE files in the case of a client device having a non-PXE partition) are downloaded to temporary memory (e.g., RAM) of the client device and the CRC values for the updates are calculated (operation 407I). If the download of any component is not successful (operation 409I), and/or if any calculated CRC value does not match a corresponding CRC value from the update configuration file (operation 411I), the imaging process is stopped and an error is returned to the RMS (operation 413I). If the downloads and CRC checks are successful, the firmware update application orders the list of component updates in an order of preference (operation 415I). For example, the component updates may be ordered such that the MBR is installed first, followed by the non-PXE files, and finally the O/S. Once the updates are ordered, the process "I" ends (operation 417I), and control passes to the "D", "E", and "F" processes (described in relation to FIGS. 4D-4F, above) to complete the updating of the MBR, non-PXE files, and O/S. If the MBR, non-PXE files, and O/S are successfully written (in processes "D", "E", and "F"), the firmware update application proceeds to operation 420 (FIG. 4A) in which a message is sent to the RMS indicating that the update of the firmware on the client device was a success and the update process ends in operation 421.

In process "I", if the firmware update application determines that the configuration file does not correspond to a partition based update (operation 403I), control passes to the process "J" (operation 405I). The process "J" is used to install disk-image based updates, which are generally completed for PXE enabled devices that do not have a non-PXE partition, and therefore do not need to update any non-PXE files, such as client devices running a Linux or Windows Embedded Compact (Windows CE) O/S. The process "J" further generally does not store a backup copy of the O/S into temporary memory during the update, and the client device may therefore not be able to recover and boot from its O/S partition if the downloaded disk image including the O/S is corrupted. However, the client device may be able to boot using a PXE module (e.g., PXE module 224) even if the O/S is corrupted, and may be able to reinitiate a firmware update following the PXE boot. According to process "J" shown in the flow diagram of FIG. 4J, the firmware update application begins by checking whether the non-volatile memory (e.g., a flash memory) of the client device is sufficiently large to accommodate the disk image including the O/S (operation 403J). In particular, the firmware update application may retrieve, from the firmware update configuration file, an indication of the size of the disk image, and may compare the retrieved indication to the size of the non-volatile memory. If the size of the non-volatile memory of the client device is insufficient, the imaging process is stopped and an error is returned to the RMS (operation 409J). If the non-volatile memory is found to be of sufficient size, the firmware update application downloads the disk image containing the O/S and updates the non-volatile memory with the downloaded image. If the firmware update configuration file includes a CRC value for the disk image, the firmware update application calculates a CRC value for the downloaded disk image as it is downloaded, and compares the calculated CRC to the CRC value in the configuration file (operation 405J). If the CRC values do not match (operation 405J), or if an error is detected during download or writing of the disk image to memory (operation 407J), the imaging process is stopped and an error is returned to the RMS (operation 409J). If no CRC value is found or if the CRC values match, and if no error is detected during the download or writing of the disk image, the disk image download and update process is successful (operation 411J). The process "J" process then ends, and the firmware update application proceeds to operation 420 (FIG. 4A) in which a message is sent to the RMS indicating that the update of the firmware on the client device was a success and the update process ends in operation 421.

Figure 4K:
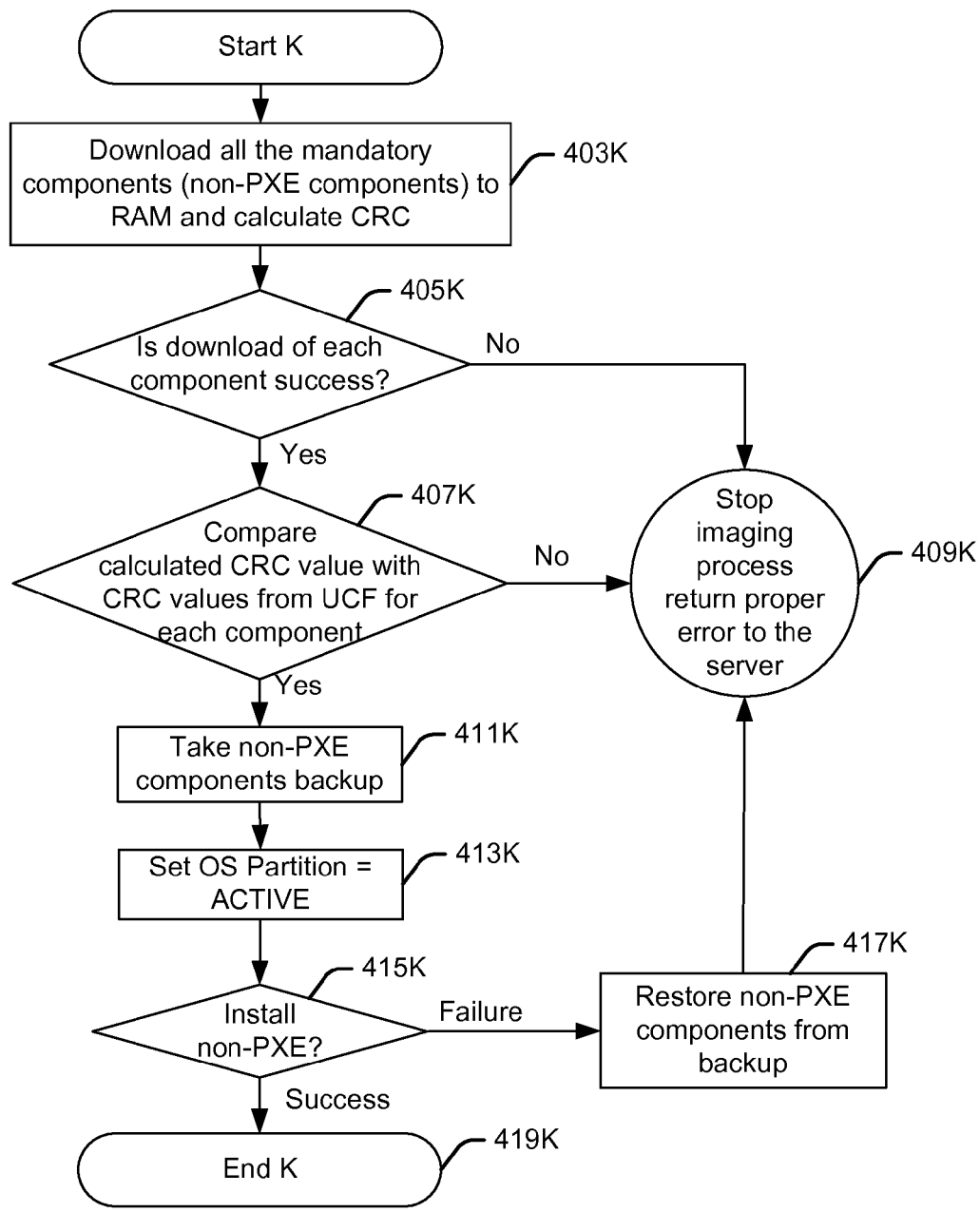

If only the non-PXE components need updating, the firmware update application proceeds to operation 408 (FIG. 4A). Following operation 408, the process "K" shown in FIG. 4K is completed. According to process "K", the firmware update application begins by downloading the mandatory component update packages (including updates for non-PXE files) from the repository server to the temporary memory (e.g., RAM) of the client device, and calculating the CRC for the downloaded package (operation 403K). If the download is not successful (operation 405K), or if the calculated CRC does not match the CRC value indicated in the firmware update configuration file for the package (operation 407K), the imaging process is stopped and an error is returned to the RMS (operation 409K). If the download is successful and the calculated CRC matches the CRC from the firmware update configuration file, the firmware update application makes a backup into temporary memory (e.g., RAM) of the non-PXE files stored in the non-PXE partition of the client device (operation 411K). The firmware update application then sets the O/S partition for the client device as the active boot partition (operation 413K), such that if the client device reboots before the update of the non-PXE files can be completed successfully, the client device will boot from the functional O/S partition rather than from the non-PXE partition which may be corrupted. Finally, the firmware update application installs the update of the non-PXE files into the non-PXE partition of the non-volatile memory of the client device (operation 415K). If any error occurs during the installation of the non-PXE files, the firmware update application restores the non-PXE partition using the backup copy of the non-PXE files (operation 417K), stops the imaging process, and returns an error message to the RMS (operation 409K). If the installation of the non-PXE files is successful, the process "K" ends (operation 419K) and the firmware update application proceeds to operation 420 (FIG. 4A) in which a message is sent to the RMS indicating that the update of the firmware on the client device was a success and the update process ends in operation 421.

Figure 4L:
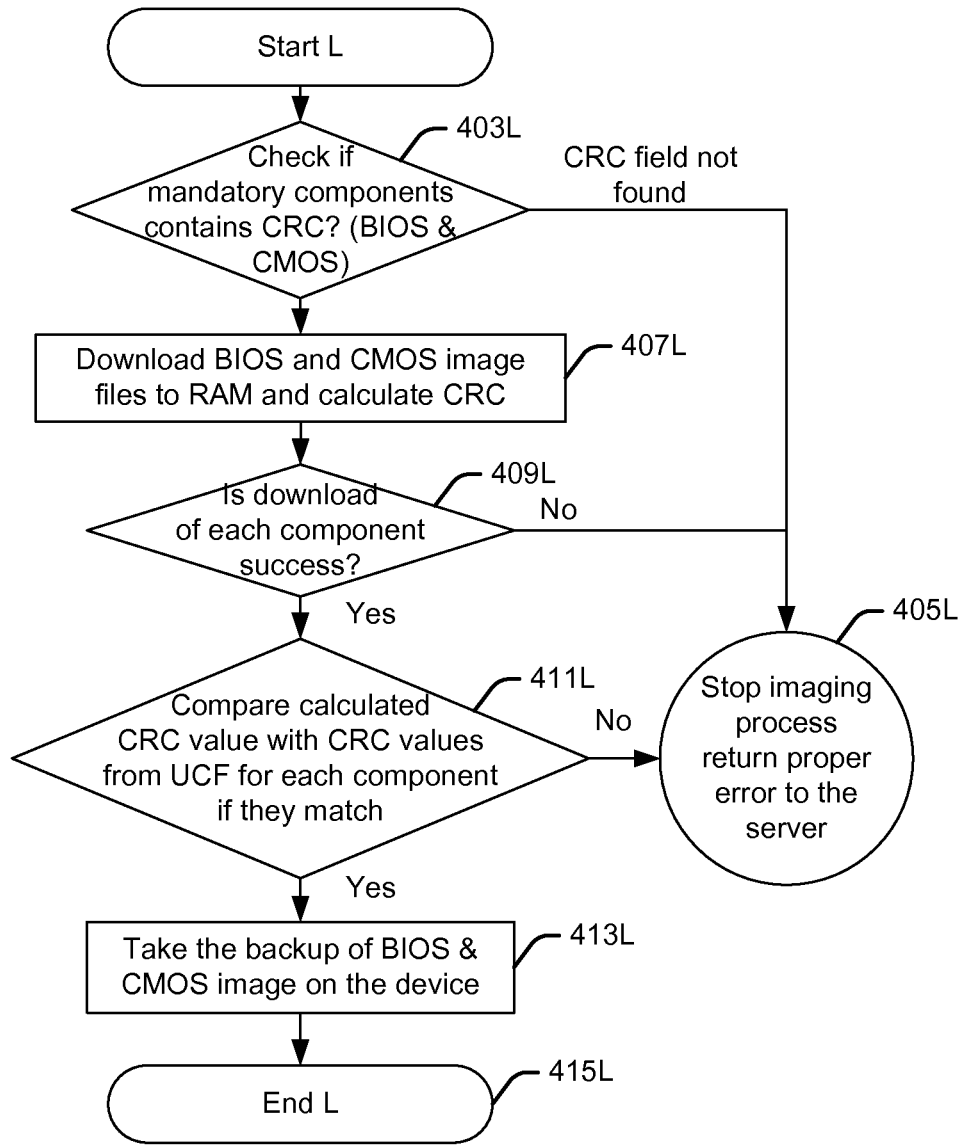

Finally, if only the BIOS and CMOS need to be updated, the firmware update application proceeds to operation 409 (FIG. 4A). Following operation 409, the processes "L" and "G" respectively shown in FIGS. 4L and 4G are sequentially completed. According to process "L", the firmware update application checks whether each of the mandatory components included in the firmware update configuration file for the firmware update (including the BIOS and CMOS) has an associated cyclic redundancy code (CRC) value included in the firmware update configuration file (operation 403L). If one or more CRC value is not found, the firmware update application stops the firmware updating process and returns an error to the RMS (operation 405L). If the CRCs are found, the firmware update application proceeds to download the mandatory components (BIOS and CMOS) to a temporary memory (e.g., a RAM) of the client device, and to calculate the CRC for each component (operation 407L). If the download of any of the mandatory components fails (operation 409L), and/or if any of the calculated CRCs do not match the CRCs included in the firmware update configuration file (operation 411L), the firmware update application stops the imaging process and returns an error to the server (operation 405L). If the downloads and CRC checks are successful, the firmware update application process to make a backup of the BIOS and CMOS in the temporary memory of the client device (operation 413L). Once the backup is completed, the process "L" ends (operation 415L), and operation proceeds to process "G" (described in relation FIG. 4G, above) to complete the updating of the BIOS and CMOS using the downloaded packages. If the BIOS and CMOS are successfully written (in process "G"), the firmware update application proceeds to operation 420 (FIG. 4A) in which a message is sent to the RMS indicating that the update of the firmware on the client device was a success and the update process ends in operation 421.

The method 400 described in relation to FIGS. 4A-4L thus provides validation of the firmware package, a recovery process, and a progressive update process. In particular, the method performs validation of firmware package as a first step after having received the update configuration file from the server. The validation includes the parsing of the configuration file to make a list of the firmware update packages and corresponding package sizes; the framing of the command list based on a preferred order of execution of each of the component updates; the retrieving of the file list and file size on the repository server from the given location (e.g., repository server address) in the configuration update file; and the calculating of a CRC value for each firmware component. The method further provides a recovery process by making a backup copy of all mandatory components prior to updating the components; updating the device either with latest firmware update (e.g., if the update is successful) or from the backup firmware files (e.g., if the update encounters a failure or error); downloading the firmware files from a repository; and sending appropriate and exact error information to the remote management server (e.g., by identifying, in the error message sent to the RMS, the type of error encountered and the update operation during which the error was detected). Finally, the method provides a process for providing progress updates during the updating process, by sending to the RMS messages indicating the start and end of each update command execution, and by calculating the percentage progress of completion of updates during execution and sending percentage progress status information to the RMS at regular intervals.

Figure 5A:
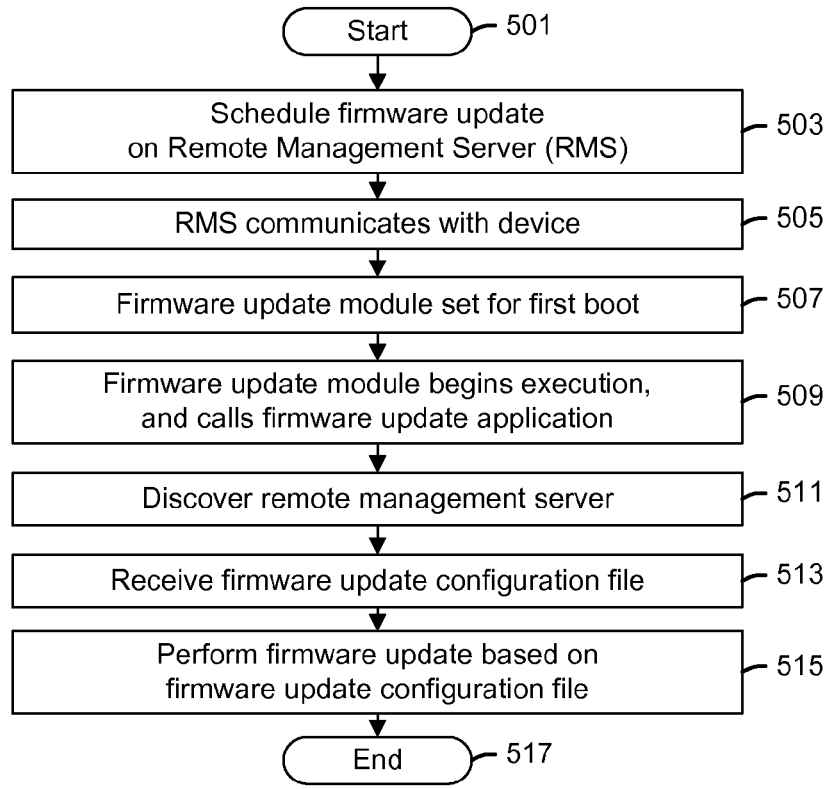
FIGS. 5A-5C are flow diagrams showing exemplary processes for initiating firmware updates on client devices, in accordance with various aspects of the subject technology.
Figure 5B:
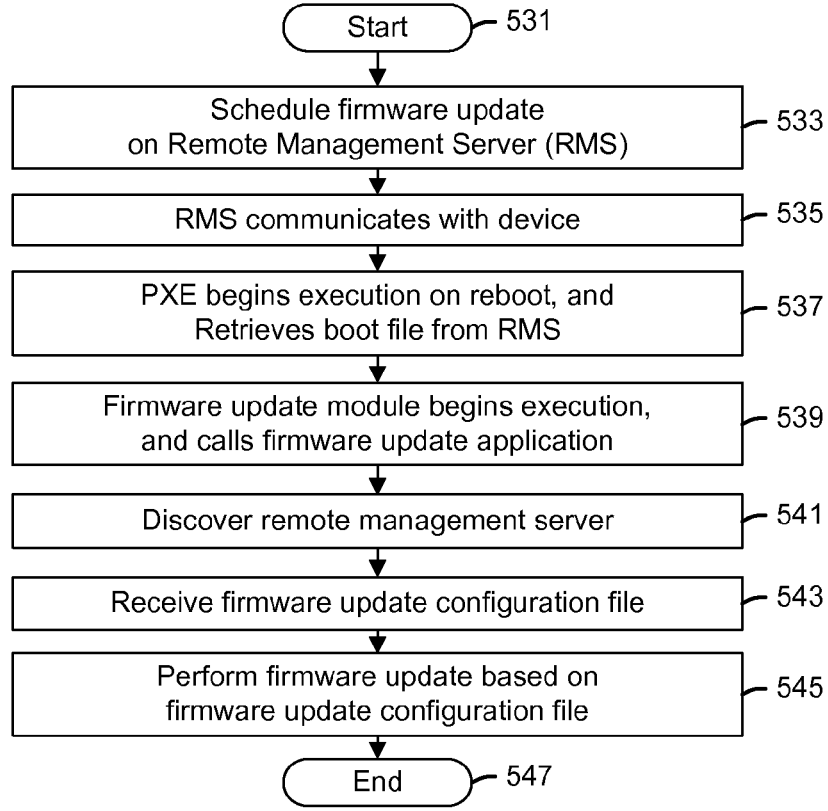
Figure 5C:
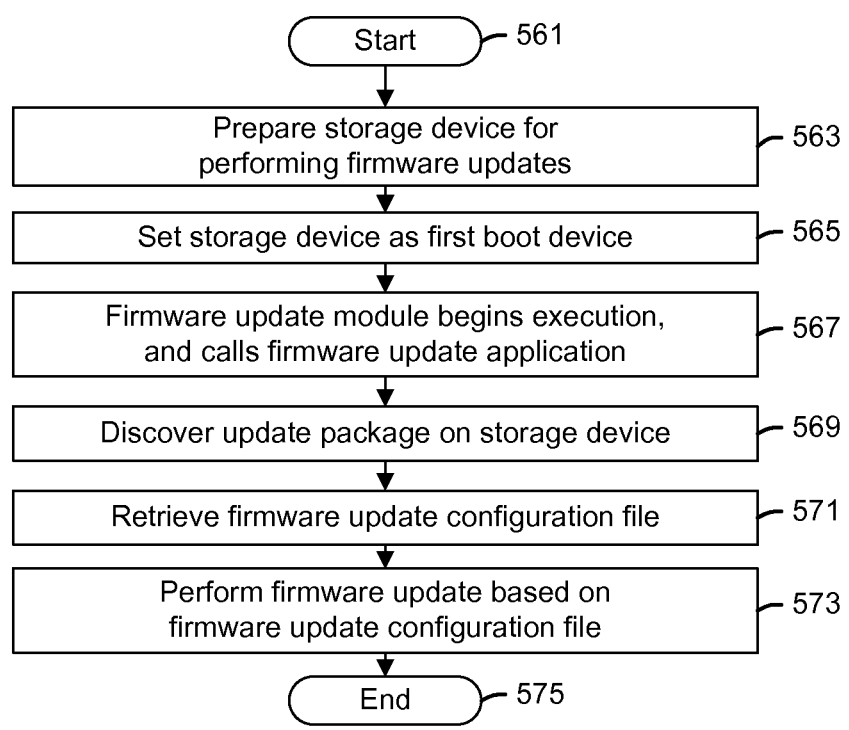

FIGS. 5A, 5B, and 5C are exemplary flow diagrams illustratively showing three different methods for initiating a firmware update on a client device. The methods described in relation to FIGS. 5A-5C may take place, for example, as operations 301-305 of the flow diagram 300 of FIG. 3. FIG. 5A shows a method for initiating a firmware update on a non-PXE supported client device; FIG. 5B shows a method for initiating a firmware update on client device not having a non-PXE partition; and FIG. 5C shows a method for initiating a firmware update using a removable storage device such as a USB thumb drive.

The method of FIG. 5A may be implemented on non-PXE supported client devices, such as client devices running operating systems such as Windows XPe, Windows Embedded Standard 2009, or Windows Embedded Standard 7. The method begins at operation 501. In operation 503, a user can schedule a firmware update using a graphical user interface (GUI) on a remote management server (RMS) (such as server 104). The firmware update can be scheduled for a specific client device, or for a group of client devices, and the scheduling may include providing an identifier for the particular client device (or particular type of client device) that the firmware update should be performed on. The firmware may be scheduled to be installed anytime, to be installed on a next boot of the client device, or optionally, the firmware may be scheduled for a particular time, for example such that the update is performed at the particular time or performed anytime on or after the particular time. The firmware update may be scheduled by selecting a non-PXE update method. The scheduling of the firmware update may also involve retrieving or creating a firmware update configuration file which identifies each of the firmware components that should be updated, and each of the update packages (and package sizes) that should be used in performing the updates. The firmware update configuration file may be stored in a firmware configuration storage (e.g., at 113 in FIG. 1) of the RMS.

In operation 505, the RMS communicates with a remote management agent running on the client device, and instructs the remote management agent to set the first boot module on the client device as the firmware update module (operation 507). In one example, the firmware update component may be set as the first boot module by changing a GRUB configuration file on the client device. In general, the remote management agent may be a service running in the operating system of the client device.

In operation 509, the client device reboots and starts execution of the BIOS. By default, the BIOS may have the first boot device as the non-volatile memory of the client device (e.g., a flash memory of the client device), and may proceed to boot from the non-volatile memory. Upon booting from the memory, the client device executes the GRUB loader which reads the GRUB configuration file, determines that the first boot module is the firmware update module stored in the non-PXE partition of the non-volatile memory, and loads the firmware update module into temporary memory (e.g., RAM) for execution. The client device then executes the firmware update module's kernel. The firmware update module's kernel boots up, and begins execution of the firmware update application (e.g., ImagingAgent.exe).

In operation 511, the firmware update application discovers the remote management server, and identifies itself to the remote management server by transmitting one or more identifiers such as a client device MAC ID, IP address, or the like. In general, an address or identifier for the remote management server is stored in the non-PXE partition such that the firmware update application can automatically discover the remote management server based on the address or identifier. In some aspects, however, the firmware update application may contact a DHCP proxy (e.g., DHCP proxy 108 of FIG. 1) to obtain an address for the remote management server, and use the obtained address to discover the remote management server. In response to receiving the identifier(s) from the client device, the remote management server checks if the client device has any firmware updates scheduled or available.

If the remote management server identifies an update for the client device, the RMS sends a response to the client device including a firmware update configuration file (e.g., a file such as command.xml) associated with the client device and identifying one or more firmware package(s) for installation on the client device. The client device receives the firmware update configuration file in operation 513.

Following receipt of the firmware update configuration file, the firmware update application running on the client device performs the firmware update(s) based on the configuration file in operation 515. Upon successful installation of the firmware update(s), the update procedure ends in operation 517.

In client devices not having a non-PXE partition, the procedure of FIG. 5B can be used to initiate a firmware update on a client device. In particular, the procedure of FIG. 5B can be used in devices which support PXE boot, and/or in client devices running operating systems such as Linux, Windows Embedded Compact (Windows CE), and older versions of Windows XPe which do not have a non-PXE partition. The method begins at operation 531. In operation 533, a user can schedule a firmware update using a graphical user interface (GUI) on a remote management server (RMS) (such as server 104). The firmware update can be scheduled for a specific client device, or for a group of client devices, in a manner similar as described in relation to operation 503 above. The firmware update may be scheduled by selecting a PXE update method.

In operation 535, the RMS communicates with the firmware update module running on the client device, and instructs the remote management agent to reboot the client device.

In operation 537, the client device reboots and starts execution of the BIOS. The BIOS identifies the PXE module as the first boot device, and proceeds to boot from the PXE module. The BIOS PXE component can try to discover the boot server by sending a DHCP option tags for the PXE boot server. The remote management server DHCP Proxy service may respond with PXE boot server information identifying the remote management server trivial file transfer protocol (TFTP) service. The client device will then request the boot file information, and will download the boot file (e.g., a firmware update module boot file) and any other necessary additional files (e.g., firmware update module kernels, such as files named "vmlinux" and "initrd") on to the temporary memory (e.g., RAM) using the TFTP protocol from the remote management server TFTP service. The BIOS PXE component may then be able to boot the device using the downloaded firmware update module kernel files.

In some situations, if the DHCP Proxy service responds with a message indicating that no updates are scheduled for the client device, the client device may stop the firmware update process and boot from the O/S partition. In some situations, if the DHCP Proxy does not provide a response including the PXE boot server information, the client device may stop the firmware update process and boot from the O/S partition.

In operation 539, the firmware update module kernel boots up, and calls the firmware update application (i.e., ImagingAgent.exe).

In operation 541, the firmware update application discovers the remote management server, and identifies itself to the remote management server by transmitting one or more identifiers such as a client device MAC ID, IP address, or the like. In response to receiving the identifier(s) from the client device, the remote management server checks if the client device has any firmware updates scheduled.

If the remote management server identifies an update for the client device, the RMS sends a response to the client device including a firmware update configuration file (e.g., a file such as command.xml) associated with the client device and identifying one or more firmware package(s) for installation on the client device. The client device receives the firmware update configuration file from the remote management server in operation 543.

Following receipt of the firmware update configuration file, the firmware update application running on the client device performs the firmware update(s) based on the configuration file in operation 545. Upon successful installation of the firmware update(s), the update procedure ends in operation 547.

A third procedure shown in FIG. 5C can be used to initiate a firmware update on a client device using a removable storage device pre-loaded with firmware update information. In one aspect, the storage device pre-loaded with the firmware update can be a USB removable storage device, such as a USB flash drive or USB thumb drive. The method of FIG. 5C can be used on both PXE supported devices, non-PXE devices, devices not having a non-PXE partition, and/or devices not having a stored firmware update module or firmware update application stored, or not having a network-accessible firmware update module or firmware update application.

The method begins at operation 561. In operation 563, a storage device is prepared for use in updating firmware on client devices by making the storage device a bootable storage device, by creating a partition on the storage device, by formatting the partition, and by installing a GRUB loader in the partition on the device. The preparation of the storage device can also involve adding or copying a firmware image package, a firmware update module and application, and/or a firmware update configuration file on to the storage device. The storage device, once prepared, can be connected to the client device that the firmware update should be performed on.

In operation 565, the client device is booted and the removable storage device is selected as the first boot device in the BIOS boot order (e.g., the removable storage device may be selected by a user as the first boot device). The BIOS loads the GRUB loader from the storage device, and the GRUB loads and begins execution of the firmware update module kernel from the storage device. The firmware update module begins execution (operation 567) in response to being loaded by the GRUB loader, and calls the firmware update application for execution. In turn, the firmware update application (e.g., ImagingAgent) begins operation.

In operation 569, the firmware update application recognizes that it should perform a storage-device-initiated firmware update process, and looks for (and discovers) the firmware update package on the storage device. In operation 571, the firmware update application finds and retrieves the firmware update configuration file from the storage device, and begins execution of the firmware update process based on the firmware update configuration file retrieved from the storage device.

In operation 573, the firmware update application running on the client device performs the firmware update(s) based on the configuration file. In some instances, the firmware update application may retrieve firmware update packages from the storage device, instead of retrieving the update packages from the remote management server or from the repository server as described in relation to FIGS. 3 and 4A-4L above. Upon successful installation of the firmware update(s), the update procedure ends in operation 575.

Figure 6:
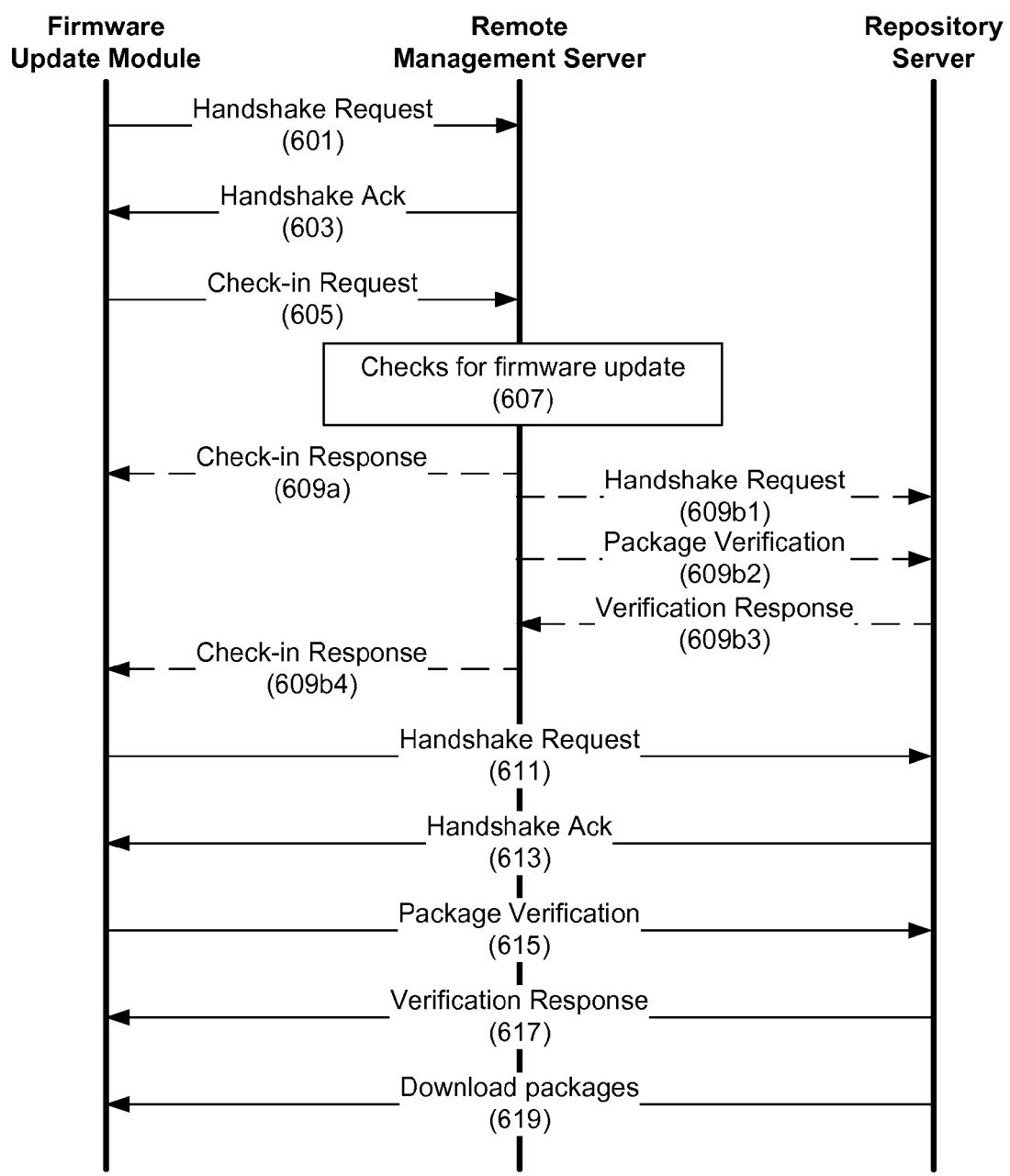
FIG. 6 is a signal timing diagram showing communications involved in initiating a firmware update and performing verification for a firmware configuration file, in accordance with various aspects of the subject technology.

FIG. 6 is an illustrative signal timing diagram 600 showing communications involved in connecting to a remote management server and in retrieving firmware update components from a repository server. The diagram of FIG. 6 shows communications between the firmware update module on the client device 102, the remote management server 104, and the repository server 106 that may take place, for example, during operations 303-311 of FIG. 3.

In operation 601, the firmware update application running on client device 102 generates and sends a handshake request to the remote management server, so as to perform server authentication. The handshake request may take the form of an HTTP post, and may be used to determine whether the firmware update application is able to communicate with the remote management server. If the firmware update application does not receive a response from the remote management server, or if the firmware update application receives an error response, the firmware update application can terminate the firmware update process. However, if the handshake request successfully reaches the remote management server, the remote management server generates and send a handshake acknowledgement to the firmware update application in operation 603.

In response to receiving the handshake acknowledgement, the firmware update application generates and sends a check-in request to the remote management server in operation 605. The check-in request generally includes one or more identifiers for the client device running the firmware update application, such as a MAC address or ID, an IP address, or the like. In response to receiving the check-in request, the remote management server checks whether any firmware updates are available or scheduled for the identified client device in operation 607. In one example, the remote management server may determine whether any firmware update configuration files associated with the client device (or with the type of client device) are stored in a firmware configuration storage of the remote management server, and determine that an update is available if such an update configuration file is found.

If no updates are determined to be available or scheduled for the client device, the remote management server sends a check-in response message indicating that no updates are available or scheduled in operation 609a. The firmware update application may terminate operation in response to receiving the check-in response message indicating that no updates are available or scheduled.

However, if one or more updates are determined to be available or scheduled, the remote management server proceeds with operations 609b1-609b4. In particular, the remote management server sends a handshake request to the repository server in operation 609b1. If the remote management server receives a handshake response from the repository server, the remote management server proceeds to retrieve from the firmware update configuration file the list of packages (or files) and corresponding package sizes identified in the configuration file. The remote management server starts a package verification process in operations 609b2 and 609b3. The package verification is performed by retrieving information on each of the packages and corresponding package sizes identified in the configuration file. The remote management server verifies whether each of the identified packages is stored in the repository, and whether each of the stored packages has the identified package size, by sending a package verification message to the repository server requesting information on packages stored by the repository server (operation 609b2). The repository server sends a verification response message to the remote management server including information about packages stored by the repository server and identified in the remote management server's package verification message (operation 609b3). The remote management server determines whether each of the identified packages is stored in the repository, and whether each of the stored packages has the identified package size, based on the received verification response message. If the remote management server determines the package verification to be a failure (e.g., if all packages identified in the configuration file are not stored in the repository, and/or if all stored packages do not have the identified package size), the remote management server updates a record to indicate that no firmware updates are available or scheduled for the client device (or for the type of client device), and sends a check-in response message indicating that no updates are available or scheduled in operation 609b4. However, if the package verification is a success (i.e., the package verification indicates that all identified packages are stored by the repository server and have the identified package sizes), the remote management server sends a check-in response including the firmware update configuration file to the firmware update module of the client device in operation 609b4.

The firmware update application may retrieve from the firmware update configuration file one or more repository paths identifying one or more repository servers storing firmware update installation packages for installation on the client device. The firmware update application may then perform operations 611-617 for each of the repository servers identified in the firmware update configuration file. Upon receiving the firmware update configuration file and identifying a repository server, the firmware update application sends a handshake request to the repository server in operation 611, so as to perform server authentication. The handshake request may be used to determine whether the firmware update application is able to communicate with the repository server. If the handshake request successfully reaches the repository server, the repository server generates and sends a handshake acknowledgement message to the firmware update application in operation 613. If the repository server handshake is not completed successfully (e.g., if no handshake acknowledgment is received, or if the handshake acknowledgment indicates a failure), the firmware update application may send an error message to the remote management server and the remote management server may update a record to indicate that no firmware updates are available or scheduled for the client device.

If the repository server handshake is completed successfully (e.g., if the handshake acknowledgment indicates a success), the firmware update application proceeds to retrieve from the firmware update configuration file the list of packages (or files) and corresponding package sizes identified in the configuration file. The firmware update application then sends a package verification request to the repository server in operation 615, the package verification request including identification for each of the packages and corresponding package sizes. The repository server provides a verification response message in operation 617 including information about packages stored by the repository server, including package size information. In response to receiving the verification response, the firmware update module determines if all packages identified in the firmware update configuration file are stored in the repository server and have the corresponding package sizes, based on the verification response message. If all packages identified in the firmware update configuration file are stored on the repository server and have the correct sizes, the verification is a success. Otherwise, the firmware update application concludes that package verification process is a failure. If the verification is a failure, the firmware update application may send an error message to the remote management server and the remote management server may update a record to indicate that the firmware update scheduled for the client device is a failure. However, if a verification is a success, the firmware update application may proceed to download the firmware update packages from the repository server in operation 619.

FIG. 7 illustrates a simplified block diagram of a client device 200, in accordance with various aspects of the subject technology. A client device 200 may comprise some or all of the following: a firmware update module 722, a master boot record (MBR) module 712, a non-PXE module 714, a BIOS module 716, a CMOS module 718, and operating system module 720, a GRUB module 728, and hardware components 730. The firmware update module 722 may comprise one or more of: a kernel and a firmware update application 723. The BIOS module 716 may comprise a PXE module 724, such as a PXE module running as an extension thereon. The operating system module 720 may comprise a remote management agent 725. In some aspects, a client device may not include the non-PXE module 714 and/or the PXE module 724. The modules and/or components of the client device 200 may be in communication with one another. In some aspects, the hardware components 730 may comprise various interface devices, and the modules of client device 200 are further in communication with the various user interface devices via a human interface devices (HID) connection. The user interface devices may include one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules may also be in communication with the public network 118 or the corporate network 114 via a network connection.

In a preferred embodiment, the modules (e.g., 712 through 728) are implemented in software (e.g., subroutines and code). In another embodiment, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the present disclosure are further described in the disclosure.

Illustration of Subject Technology as Clauses

Illustration of Method/Apparatus/Machine Readable Storage Medium (Described as Clauses)

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Examples of Method Clauses

Figure 8A:
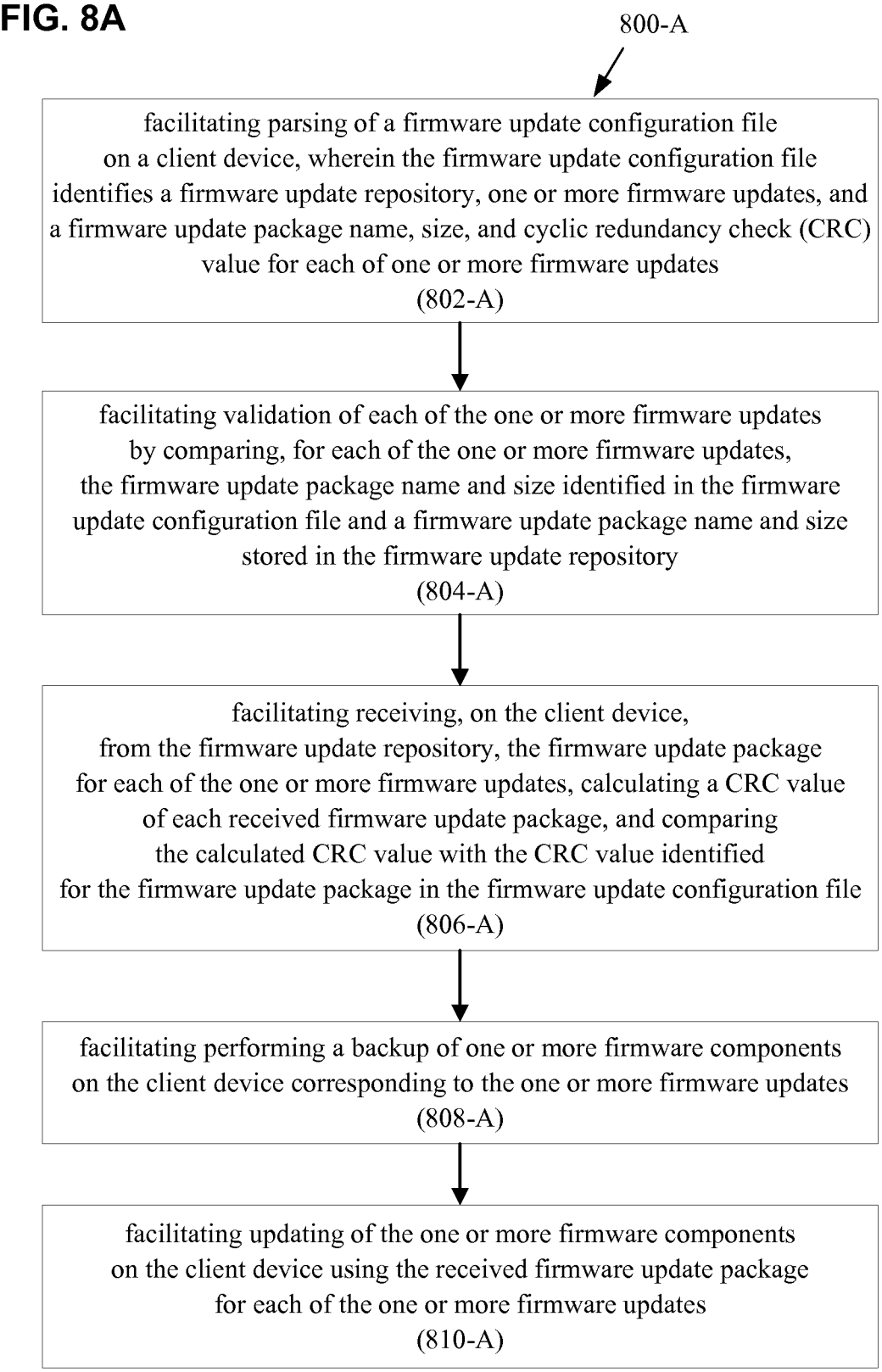
FIG. 8A is a block diagram representing an example of a method for updating firmware components of a client device, in accordance with one aspect of the disclosure.

1. A method (see, e.g., 800-A in FIG. 8A) for updating firmware components of a client device using a firmware update module running on the client device, the method comprising:

facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates (see, e.g., 802-A in FIG. 8A);

facilitating validation of each of the one or more firmware updates by comparing, for each of the one or more firmware updates, the firmware update package name and size identified in the firmware update configuration file and a firmware update package name and size stored in the firmware update repository (see, e.g., 804-A in FIG. 8A);

facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file (see, e.g., 806-A in FIG. 8A);

facilitating performing a backup of one or more firmware components on the client device corresponding to the one or more firmware updates (see, e.g., 808-A in FIG. 8A); and facilitating updating of the one or more firmware components on the client device using the received firmware update package for each of the one or more firmware updates (see, e.g., 810-A in FIG. 8A).

2. The method of clause 1, wherein the one or more firmware updates include an update for at least one of a master boot record (MBR), a basic input/output system (BIOS), a complementary metal-oxide-semiconductor (CMOS) memory, a firmware update module, and an operating system on the client device.

3. The method of clause 1, wherein the firmware update module is stored in a dedicated partition of a non-volatile memory of the client device, the method further comprising:

facilitating booting the client device from the dedicated partition of the non-volatile memory storing the firmware update module.

4. The method of clause 1 further comprising:

facilitating booting the client device using a pre-boot execution (PXE) module of the client device; and facilitating retrieving, as part of the booting of the client device, the firmware update module from a PXE server in communication with the client device.

5. The method of clause 1, wherein the firmware update module and the firmware update configuration file are stored in a removable storage device connected to the client device, the method further comprising:

facilitating booting the client device from the removable storage device storing the firmware update module and the firmware update configuration file.

6. The method of clause 1, wherein the client device is in communication with a remote management server, the method further comprising:

facilitating scheduling, on the remote management server, a firmware update for updating firmware components of the client device; and facilitating receiving, on the client device from the remote management server, the firmware update configuration file.

7. The method of clause 1, further comprising:

facilitating determination that the updating of a particular firmware component of the one or more firmware components on the client has failed; and in response to the determination, facilitating restoring of the particular firmware component on the client device from the backup of the firmware component.

8. The method of clause 1, wherein the client device comprises a non-volatile memory having first and second partitions, the method further comprising:

prior to facilitating updating of a firmware components located on the first partition of the non-volatile memory, facilitating setting of the second partition of the non-volatile memory as the primary boot partition on the client device.

Examples of Machine-Readable Medium Clauses

9. A machine-readable storage medium (see, e.g., 800-B in FIG. 8B) encoded with instructions executable by one or more processors to perform one or more operations for updating firmware components of a client device using a firmware update module running on the client device, the one or more operations comprising:

facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates (see, e.g., 802-B in FIG. 8B);

facilitating validation of each of the one or more firmware updates by comparing, for each of the one or more firmware updates, the firmware update package name and size identified in the firmware update configuration file and a firmware update package name and size stored in the firmware update repository (see, e.g., 804-B in FIG. 8B);

facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file (see, e.g., 806-B in FIG. 8B);

facilitating performing a backup of one or more firmware components on the client device corresponding to the one or more firmware updates (see, e.g., 808-B in FIG. 8B); and facilitating updating of the one or more firmware components on the client device using the received firmware update package for each of the one or more firmware updates (see, e.g., 810-B in FIG. 8B).

10. The machine-readable storage medium of clause 9, wherein the one or more firmware updates include an update for at least one of a master boot record (MBR), a basic input/output system (BIOS), a complementary metal-oxide-semiconductor (CMOS) memory, a firmware update module, and an operating system on the client device.

11. The machine-readable storage medium of clause 9, wherein the firmware update module is stored in a dedicated partition of a non-volatile memory of the client device, and wherein the one or more operations further comprise:

facilitating booting the client device from the dedicated partition of the non-volatile memory storing the firmware update module.

12. The machine-readable storage medium of clause 9, wherein the one or more operations further comprise:

facilitating booting the client device using a pre-boot execution (PXE) module of the client device; and facilitating retrieving, as part of the booting of the client device, the firmware update module from a PXE server in communication with the client device.

13. The machine-readable storage medium of clause 9, wherein the firmware update module and the firmware update configuration file are stored in a removable storage device connected to the client device, and wherein the one or more operations further comprise:

facilitating booting the client device from the removable storage device storing the firmware update module and the firmware update configuration file.

14. The machine-readable storage medium of clause 9, wherein the client device is in communication with a remote management server, and wherein the one or more operations further comprise:

facilitating scheduling, on the remote management server, a firmware update for updating firmware components of the client device; and facilitating receiving, on the client device from the remote management server, the firmware update configuration file.

15. The machine-readable storage medium of clause 9, wherein the one or more operations further comprise:

facilitating determination that the updating of a particular firmware component of the one or more firmware components on the client has failed; and in response to the determination, facilitating restoring of the particular firmware component on the client device from the backup of the firmware component.

16. The machine-readable storage medium of clause 9, wherein the client device comprises a non-volatile memory having first and second partitions, and wherein the one or more operations further comprise:

prior to facilitating updating of a firmware components located on the first partition of the non-volatile memory, facilitating setting of the second partition of the non-volatile memory as the primary boot partition on the client device.

Examples of Hardware Apparatus Clauses

17. A hardware apparatus (see, e.g., 800-C in FIG. 8C) for updating firmware components of a client device using a firmware update module running on the client device, the hardware apparatus comprising:

one or more modules configured to perform one or more operations comprising:

facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates (see, e.g., 802-C in FIG. 8C);

facilitating validation of each of the one or more firmware updates by comparing, for each of the one or more firmware updates, the firmware update package name and size identified in the firmware update configuration file and a firmware update package name and size stored in the firmware update repository (see, e.g., 804-C in FIG. 8C);

facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file (see, e.g., 806-C in FIG. 8C);

facilitating performing a backup of one or more firmware components on the client device corresponding to the one or more firmware updates (see, e.g., 808-C in FIG. 8C); and facilitating updating of the one or more firmware components on the client device using the received firmware update package for each of the one or more firmware updates (see, e.g., 810-C in FIG. 8C).

18. The hardware apparatus of clause 17, wherein the one or more firmware updates include an update for at least one of a master boot record (MBR), a basic input/output system (BIOS), a complementary metal-oxide-semiconductor (CMOS) memory, a firmware update module, and an operating system on the client device.

19. The hardware apparatus of clause 17, wherein the firmware update module is stored in a dedicated partition of a non-volatile memory of the client device, and wherein the one or more operations further comprise:

facilitating booting the client device from the dedicated partition of the non-volatile memory storing the firmware update module.

20. The hardware apparatus of clause 17, wherein the one or more operations further comprise:

facilitating booting the client device using a pre-boot execution (PXE) module of the client device; and facilitating retrieving, as part of the booting of the client device, the firmware update module from a PXE server in communication with the client device.

21. The hardware apparatus of clause 17, wherein the firmware update module and the firmware update configuration file are stored in a removable storage device connected to the client device, and wherein the one or more operations further comprise:

facilitating booting the client device from the removable storage device storing the firmware update module and the firmware update configuration file.

22. The hardware apparatus of clause 17, wherein the client device is in communication with a remote management server, and wherein the one or more operations further comprise:

facilitating scheduling, on the remote management server, a firmware update for updating firmware components of the client device; and facilitating receiving, on the client device from the remote management server, the firmware update configuration file.

23. The hardware apparatus of clause 17, wherein the one or more operations further comprise:

facilitating determination that the updating of a particular firmware component of the one or more firmware components on the client has failed; and in response to the determination, facilitating restoring of the particular firmware component on the client device from the backup of the firmware component.

24. The hardware apparatus of clause 17, wherein the client device comprises a non-volatile memory having first and second partitions, and wherein the one or more operations further comprise:

prior to facilitating updating of a firmware components located on the first partition of the non-volatile memory, facilitating setting of the second partition of the non-volatile memory as the primary boot partition on the client device.

Examples of Apparatus Clauses

25. An apparatus (see, e.g., 800-C in FIG. 8C) for updating firmware components of a client device using a firmware update module running on the client device, the apparatus comprising:

means for facilitating parsing of a firmware update configuration file on the client device, wherein the firmware update configuration file identifies a firmware update repository, one or more firmware updates, and a firmware update package name, size, and cyclic redundancy check (CRC) value for each of the one or more firmware updates (see, e.g., 802-C in FIG. 8C);

means for facilitating validation of each of the one or more firmware updates by comparing, for each of the one or more firmware updates, the firmware update package name and size identified in the firmware update configuration file and a firmware update package name and size stored in the firmware update repository (see, e.g., 804-C in FIG. 8C);

means for facilitating receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file (see, e.g., 806-C in FIG. 8C);

means for facilitating performing a backup of one or more firmware components on the client device corresponding to the one or more firmware updates (see, e.g., 808-C in FIG. 8C); and means for facilitating updating of the one or more firmware components on the client device using the received firmware update package for each of the one or more firmware updates (see, e.g., 810-C in FIG. 8C).

26. The apparatus of clause 25, wherein the one or more firmware updates include an update for at least one of a master boot record (MBR), a basic input/output system (BIOS), a complementary metal-oxide-semiconductor (CMOS) memory, a firmware update module, and an operating system on the client device.

27. The apparatus of clause 25, wherein the firmware update module is stored in a dedicated partition of a non-volatile memory of the client device, the apparatus further comprising:

means for facilitating booting the client device from the dedicated partition of the non-volatile memory storing the firmware update module.

28. The apparatus of clause 25, further comprising:

means for facilitating booting the client device using a pre-boot execution (PXE) module of the client device; and means for facilitating retrieving, as part of the booting of the client device, the firmware update module from a PXE server in communication with the client device.

29. The apparatus of clause 25, wherein the firmware update module and the firmware update configuration file are stored in a removable storage device connected to the client device, the apparatus further comprising:

means for facilitating booting the client device from the removable storage device storing the firmware update module and the firmware update configuration file.

30. The apparatus of clause 25, wherein the client device is in communication with a remote management server, the apparatus further comprising:

means for facilitating scheduling, on the remote management server, a firmware update for updating firmware components of the client device; and means for facilitating receiving, on the client device from the remote management server, the firmware update configuration file.

31. The apparatus of clause 25, further comprising:

means for facilitating determination that the updating of a particular firmware component of the one or more firmware components on the client has failed; and means for, in response to the determination, facilitating restoring of the particular firmware component on the client device from the backup of the firmware component.

32. The apparatus of clause 25, wherein the client device comprises a non-volatile memory having first and second partitions, the apparatus further comprising:

means for, prior to facilitating updating of a firmware components located on the first partition of the non-volatile memory, facilitating setting of the second partition of the non-volatile memory as the primary boot partition on the client device.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., the firmware update, PXE, MBR, non-PXE, BIOS, CMOS, and operating system modules, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.). Those skilled in the art will recognize how to implement the instructions, circuits, and processing systems.

A reference to an element in the singular is not intended to mean "one and only one" unless specifically so stated, but rather "one or more." For example, a message or transmission may refer to one or more messages or transmissions, a firmware update configuration file or module may refer to one or more firmware update configuration files or modules, a server may refer to one or more servers, a machine readable medium or memory may refer to one or more machine readable media or memories, and a signal may refer to differential voltage signals.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., receiving, determining, discovering, parsing, validating, comparing, downloading, performing, installing, updating, providing, generating, converting, displaying, notifying, accepting, selecting, controlling, transmitting, reporting, sending, or any other action or function), it is understood that such actions or functions may be performed by the item directly or indirectly. In one aspect, when a module is described as performing an action, the module may be understood to perform the action directly. In one aspect, when a module is described as performing an action, the module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

Various items may be arranged differently (e.g., arranged in a different order, or partitioned in a different way) all without departing from the scope of the subject technology. In one example, backing up of firmware components (operation 313) may be performed separately for each firmware component after completing operation 317. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

APPENDIX A

Below is an example of a firmware update configuration file, such as a firmware update configuration file that is an XML file (e.g., a file named command.xml):

```xml
<imageType>
    <sourceMethod>
        <merlinImage>
            <versionNumber>2.0.1</versionNumber>
        </merlinImage>
    </sourceMethod>
</imageType>
<commandSet>
<commandEnvelope>
    <downloadImageFromServer>
        <transferEncoding>
            <type>gzip</type>
            <encodedSize>464</encodedSize>
        </transferEncoding>
        <source>
            <location>mbr.img</location>
            <checksum></checksum>
            <size>512</size>
        </source>
        <destination>
            <securityKey>
                <masterKey>01010B24</masterKey>
                <masterKeyMask>FFFFFFFF</masterKeyMask>
                <supportedKeySet>
                    <supportedKey>
                        <key>01010B24</key>
                        <mask>FFFFFFFF</mask>
                    </supportedKey>
                </supportedKeySet>
            </securityKey>
            <ide>
                <channel>0</channel>
                <drive>0</drive>
                <scope><mbr/></scope>
            </ide>
        </destination>
    </downloadImageFromServer>
</commandEnvelope>
<commandEnvelope>
    <downloadMerlinBAImageFromServer>
        <source>
            <location>initrd.pxe</location>
            <checksum></checksum>
            <size>7735698</size>
        </source>
        <destination>
            <securityKey>
                <masterKey>01010B24</masterKey>
                <masterKeyMask>FFFFFFFF</masterKeyMask>
                <supportedKeySet>
                    <supportedKey>
                        <key>01010B24</key>
                        <mask>FFFFFFFF</mask>
                    </supportedKey>
                </supportedKeySet>
            </securityKey>
            <ide>
                <channel>0</channel>
                <drive>0</drive>
                <scope>
                    <partition>
                        <number>0</number>
                    </partition>
                </scope>
            </ide>
        </destination>
    </downloadMerlinBAImageFromServer>
</commandEnvelope>
<commandEnvelope>
    <downloadMerlinBAImageFromServer>
        <source>
            <location>vmlinuz</location>
            <checksum></checksum>
            <size>2183488</size>
        </source>
        <destination>
            <securityKey>
                <masterKey>01010B24</masterKey>
                <masterKeyMask>FFFFFFFF</masterKeyMask>
                <supportedKeySet>
                    <supportedKey>
                        <key>01010B24</key>
                        <mask>FFFFFFFF</mask>
                    </supportedKey>
                </supportedKeySet>
            </securityKey>
            <ide>
                <channel>0</channel>
                <drive>0</drive>
                <scope>
                    <partition>
                        <number>0</number>
                    </partition>
                </scope>
            </ide>
        </destination>
    </downloadMerlinBAImageFromServer>
</commandEnvelope>
<commandEnvelope>
    <downloadImageFromServer>
        <transferEncoding>
            <type>gzip</type>
            <encodedSize>2231632561</encodedSize>
        </transferEncoding>
        <source>
            <location>par1.img</location>
            <checksum></checksum>
            <size>4078632960</size>
        </source>
        <destination>
            <securityKey>
                <masterKey>01010B24</masterKey>
                <masterKeyMask>FFFFFFFF</masterKeyMask>
                <supportedKeySet>
                    <supportedKey>
                        <key>01010B24</key>
                        <mask>FFFFFFFF</mask>
                    </supportedKey>
                </supportedKeySet>
            </securityKey>
            <ide>
                <channel>0</channel>
                <drive>0</drive>
                <scope>
                    <partition>
                        <number>1</number>
                    </partition>
                </scope>
            </ide>
        </destination>
```

```
            </downloadImageFromServer>
        </commandEnvelope>
        <commandEnvelope>
            <downloadImageFromServer>
                <transferEncoding>
                    <type>gzip</type>
                    <encodedSize>1611286</encodedSize>
                </transferEncoding>
                <source>
                    <location>bios.img</location>
                    <checksum></checksum>
                    <size>4194384</size>
                </source>
                <destination>
                    <securityKey>
                        <masterKey>01010B24</masterKey>
                        <masterKeyMask>FFFFFFFF</masterKeyMask>
                        <supportedKeySet>
                            <supportedKey>
                                <key>01010B24</key>
                                <mask>FFFFFFFF</mask>
                            </supportedKey>
                        </supportedKeySet>
                    </securityKey>
                    <bios/>
                </destination>
            </downloadImageFromServer>
        </commandEnvelope>
    </commandSet>
```

What is claimed is:

1. A method for updating firmware components of a client device using a firmware update module running on the client device, the method comprising:
   receiving of a firmware update configuration file at the client device, wherein the firmware update configuration file identifies a firmware update repository, one or more firmware updates, and a firmware update package name, size, and cyclic redundancy check (CRC) value for each of the one or more firmware updates;
   parsing of the firmware update configuration file on the client device;
   communicating with the firmware update repository to validate each of the one or more firmware updates by comparing, for each of the one or more firmware updates, the firmware update package name and size identified in the firmware update configuration file and a firmware update package name and size stored in the firmware update repository;
   receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file;
   performing a backup of one or more firmware components on the client device corresponding to the one or more firmware updates; and
   updating of the one or more firmware components on the client device using the received firmware update package for each of the one or more firmware updates.

2. The method of claim 1, wherein the one or more firmware updates include an update for at least one of a master boot record (MBR), a basic input/output system (BIOS), a complementary metal-oxide-semiconductor (CMOS) memory, a firmware update module, and an operating system on the client device.

3. The method of claim 1, wherein the firmware update module is stored in a dedicated partition of a non-volatile memory of the client device, the method further comprising:
   booting the client device from the dedicated partition of the non-volatile memory storing the firmware update module.

4. The method of claim 1 further comprising:
   booting the client device using a pre-boot execution (PXE) module of the client device; and
   retrieving, as part of the booting of the client device, the firmware update module from a PXE server in communication with the client device.

5. The method of claim 1, wherein the firmware update module and the firmware update configuration file are stored in a removable storage device connected to the client device, the method further comprising:
   booting the client device from the removable storage device storing the firmware update module and the firmware update configuration file.

6. The method of claim 1, wherein the client device is in communication with a remote management server, the method further comprising:
   scheduling, on the remote management server, a firmware update for updating firmware components of the client device; and
   receiving, on the client device from the remote management server, the firmware update configuration file.

7. The method of claim 1, further comprising:
   determination that the updating of a particular firmware component of the one or more firmware components on the client has failed; and
   in response to the determination, restoring of the particular firmware component on the client device from the backup of the firmware component.

8. The method of claim 1, wherein the client device comprises a non-volatile memory having first and second partitions, the method further comprising:
   prior to updating of a firmware components located on the first partition of the non-volatile memory, setting of the second partition of the non-volatile memory as the primary boot partition on the client device.

9. A machine-readable storage medium encoded with instructions executable by one or more processors to perform one or more operations for updating firmware components of a client device using a firmware update module running on the client device, the one or more operations comprising:
   receiving of a firmware update configuration file at the client device, wherein the firmware update configuration file identifies a firmware update repository, one or more firmware updates, and a firmware update package name, size, and cyclic redundancy check (CRC) value for each of the one or more firmware updates;
   parsing of the firmware update configuration file on the client device;
   communicating with the firmware update repository to validate each of the one or more firmware updates by comparing, for each of the one or more firmware updates, the firmware update package name and size identified in the firmware update configuration file and a firmware update package name and size stored in the firmware update repository;
   receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file;

performing a backup of one or more firmware components on the client device corresponding to the one or more firmware updates; and updating of the one or more firmware components on the client device using the received firmware update package for each of the one or more firmware updates.

10. The machine-readable storage medium of claim 9, wherein the one or more firmware updates include an update for at least one of a master boot record (MBR), a basic input/output system (BIOS), a complementary metal-oxide-semiconductor (CMOS) memory, a firmware update module, and an operating system on the client device.

11. The machine-readable storage medium of claim 9, wherein the firmware update module is stored in a dedicated partition of a non-volatile memory of the client device, and wherein the one or more operations further comprise:
booting the client device from the dedicated partition of the non-volatile memory storing the firmware update module.

12. The machine-readable storage medium of claim 9, wherein the one or more operations further comprise:
booting the client device using a pre-boot execution (PXE) module of the client device; and
retrieving, as part of the booting of the client device, the firmware update module from a PXE server in communication with the client device.

13. The machine-readable storage medium of claim 9, wherein the firmware update module and the firmware update configuration file are stored in a removable storage device connected to the client device, and wherein the one or more operations further comprise:
booting the client device from the removable storage device storing the firmware update module and the firmware update configuration file.

14. The machine-readable storage medium of claim 9, wherein the client device is in communication with a remote management server, and wherein the one or more operations further comprise:
scheduling, on the remote management server, a firmware update for updating firmware components of the client device; and
receiving, on the client device from the remote management server, the firmware update configuration file.

15. The machine-readable storage medium of claim 9, wherein the one or more operations further comprise:
determination that the updating of a particular firmware component of the one or more firmware components on the client has failed; and
in response to the determination, restoring of the particular firmware component on the client device from the backup of the firmware component.

16. The machine-readable storage medium of claim 9, wherein the client device comprises a non-volatile memory having first and second partitions, and wherein the one or more operations further comprise:
prior to updating of a firmware components located on the first partition of the non-volatile memory, setting of the second partition of the non-volatile memory as the primary boot partition on the client device.

17. A hardware apparatus for updating firmware components of a client device using a firmware update module running on the client device, the hardware apparatus comprising:
one or more modules configured to perform one or more operations comprising:
receiving of a firmware update configuration file at the client device, wherein the firmware update configuration file identifies a firmware update repository, one or more firmware updates, and a firmware update package name, size, and cyclic redundancy check (CRC) value for each of the one or more firmware updates;
parsing of the firmware update configuration file on the client device;
communicating with the firmware update repository to validate each of the one or more firmware updates by comparing, for each of the one or more firmware updates, the firmware update package name and size identified in the firmware update configuration file and a firmware update package name and size stored in the firmware update repository;
receiving, on the client device, from the firmware update repository, the firmware update package for each of the one or more firmware updates, calculating a CRC value of each received firmware update package, and comparing the calculated CRC value with the CRC value identified for the firmware update package in the firmware update configuration file;
performing a backup of one or more firmware components on the client device corresponding to the one or more firmware updates; and
updating of the one or more firmware components on the client device using the received firmware update package for each of the one or more firmware updates.

18. The hardware apparatus of claim 17, wherein the one or more firmware updates include an update for at least one of a master boot record (MBR), a basic input/output system (BIOS), a complementary metal-oxide-semiconductor (CMOS) memory, a firmware update module, and an operating system on the client device.

19. The hardware apparatus of claim 17, wherein the firmware update module is stored in a dedicated partition of a non-volatile memory of the client device, and wherein the one or more operations further comprise:
booting the client device from the dedicated partition of the non-volatile memory storing the firmware update module.

20. The hardware apparatus of claim 17, wherein the one or more operations further comprise:
booting the client device using a pre-boot execution (PXE) module of the client device; and
retrieving, as part of the booting of the client device, the firmware update module from a PXE server in communication with the client device.

21. The hardware apparatus of claim 17, wherein the firmware update module and the firmware update configuration file are stored in a removable storage device connected to the client device, and wherein the one or more operations further comprise:
booting the client device from the removable storage device storing the firmware update module and the firmware update configuration file.

22. The hardware apparatus of claim 17, wherein the client device is in communication with a remote management server, and wherein the one or more operations further comprise:
scheduling, on the remote management server, a firmware update for updating firmware components of the client device; and
receiving, on the client device from the remote management server, the firmware update configuration file.

23. The hardware apparatus of claim 17, wherein the one or more operations further comprise:
   determination that the updating of a particular firmware component of the one or more firmware components on the client has failed; and in response to the determination, restoring of the particular firmware component on the client device from the backup of the firmware component.

24. The hardware apparatus of claim 17, wherein the client device comprises a non-volatile memory having first and second partitions, and wherein the one or more operations further comprise:
   prior to updating of a firmware components located on the first partition of the non-volatile memory, setting of the second partition of the non-volatile memory as the primary boot partition on the client device.

* * * * *